(12) United States Patent
Suzuki et al.

(10) Patent No.: US 8,929,647 B2
(45) Date of Patent: Jan. 6, 2015

(54) IMAGE PROCESSING APPARATUS AND CONTROL METHOD THEREFOR

(71) Applicant: Canon Kabushiki Kaisha, Tokyo (JP)

(72) Inventors: Yasuo Suzuki, Yokohama (JP); Izumi Kanai, Machida (JP); Kazuhiko Nakazawa, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 13/827,300

(22) Filed: Mar. 14, 2013

(65) Prior Publication Data

US 2013/0259365 A1    Oct. 3, 2013

(30) Foreign Application Priority Data

Mar. 30, 2012  (JP) .................................. 2012-081335
Apr.  2, 2012  (JP) .................................. 2012-084188
Feb. 13, 2013  (JP) .................................. 2013-025904

(51) Int. Cl.
*G06K 9/34* (2006.01)
*G06K 9/46* (2006.01)
*G06T 5/00* (2006.01)
*G06T 7/00* (2006.01)

(52) U.S. Cl.
CPC .............. *G06K 9/4652* (2013.01); *G06T 5/007* (2013.01); *G06T 7/0081* (2013.01); *G06T 2207/10024* (2013.01)
USPC ............ 382/164; 382/162; 382/165; 382/167

(58) Field of Classification Search
CPC ....... G06T 11/001; G06T 7/408; G06T 5/001; G06T 7/0081; G06T 2207/10024; G06K 9/4652; G06K 9/38; H04N 9/045; H04N 1/6058; H04N 1/60; H04N 1/6027
USPC .......... 382/239, 162, 164, 165, 167; 358/520, 358/1.9, 453, 462; 700/245; 180/170; 318/568.11

See application file for complete search history.

(56) References Cited

U.S. PATENT DOCUMENTS 5,966,468 A  * 10/1999 Fujimoto ....................... 382/239
7,468,821 B2 * 12/2008 Hashiguchi et al. .......... 358/520

FOREIGN PATENT DOCUMENTS

JP         2003-244469       8/2003     .............. H04N 1/50

* cited by examiner

*Primary Examiner* — Anh Do
(74) *Attorney, Agent, or Firm* — Cowan, Liebowitz & Latman, P.C.

(57) ABSTRACT

An image processing apparatus according to the present invention determines a monochrome area and a color area of an input image. The apparatus comprises an acquisition unit that acquires an image characteristic value of the input image; and a determination unit that determines whether each pixel group in the input image is a monochrome area or a color area based on the image characteristic value acquired by the acquisition unit, wherein the acquisition unit acquires a plurality of image characteristic values corresponding to a plurality of acquisition areas including a determination target pixel group, and the determination unit determines whether the pixel group is a monochrome area or a color area based on the plurality of image characteristic values corresponding to the plurality of acquisition areas including the pixel group.

20 Claims, 34 Drawing Sheets

MEDICAL VIEWER IMAGE 201    X-RAY IMAGE 202

INPUT IMAGE
MONOCHROME AREA 1001

INPUT IMAGE
MONOCHROME AREA 1002

FIG. 11
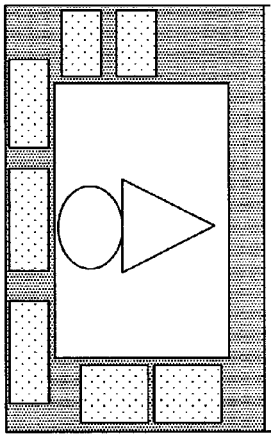
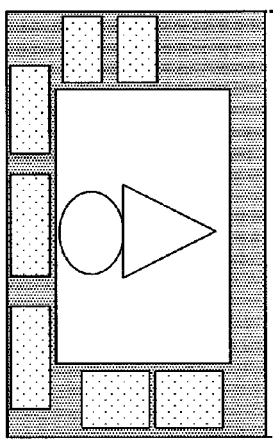
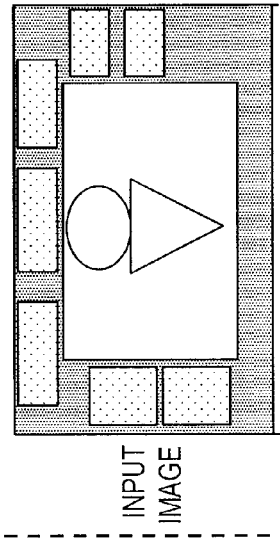

FIG. 16

| | COLOR HISTOGRAM | BRIGHTNESS HISTOGRAM |
|---|---|---|
| COLOR AREA | MULTI-COLOR | ANY DISTRIBUTION |
| MONOCHROME AREA | MONOCHROME | MULTI-GRADATION |
| BLACK AREA | MONOCHROME | SINGLE-GRADATION |

☐ COLOR AREA
■ MONOCHROME AREA
▨ BLACK AREA

☐ COLOR AREA
■ MONOCHROME AREA
▨ BLACK AREA

FIG. 21

| | COLOR HISTOGRAM | BRIGHTNESS HISTOGRAM |
|---|---|---|
| COLOR AREA | MULTI-COLOR | ANY DISTRIBUTION |
| COMMENT AREA | MONOCHROME AND SINGLE COLOR | ANY DISTRIBUTION |
| MONOCHROME AREA | MONOCHROME | MULTI-GRADATION |
| BLACK AREA | MONOCHROME | SINGLE-GRADATION |

X-RAY IMAGE 1502        ENDOSCOPE IMAGE 1501

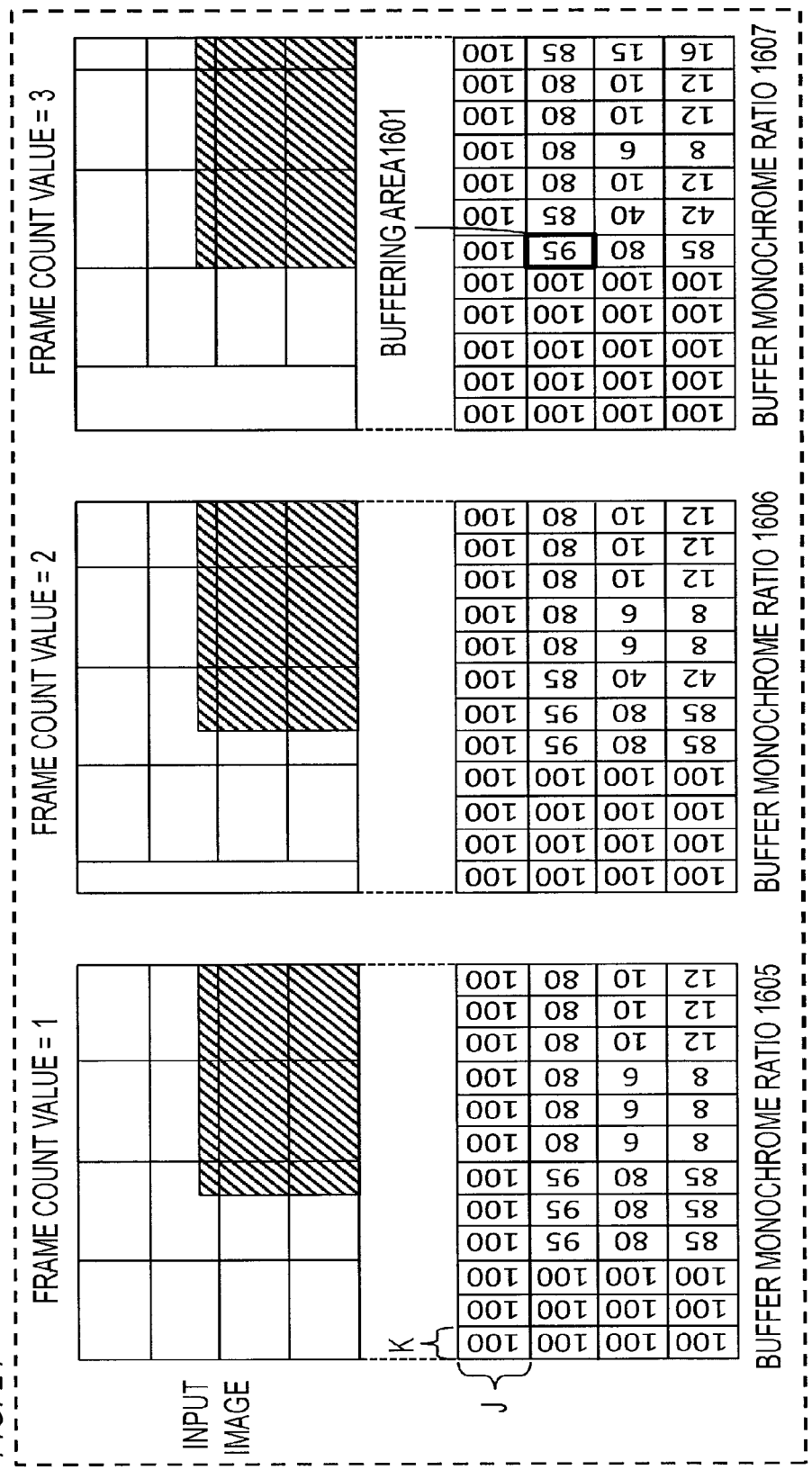

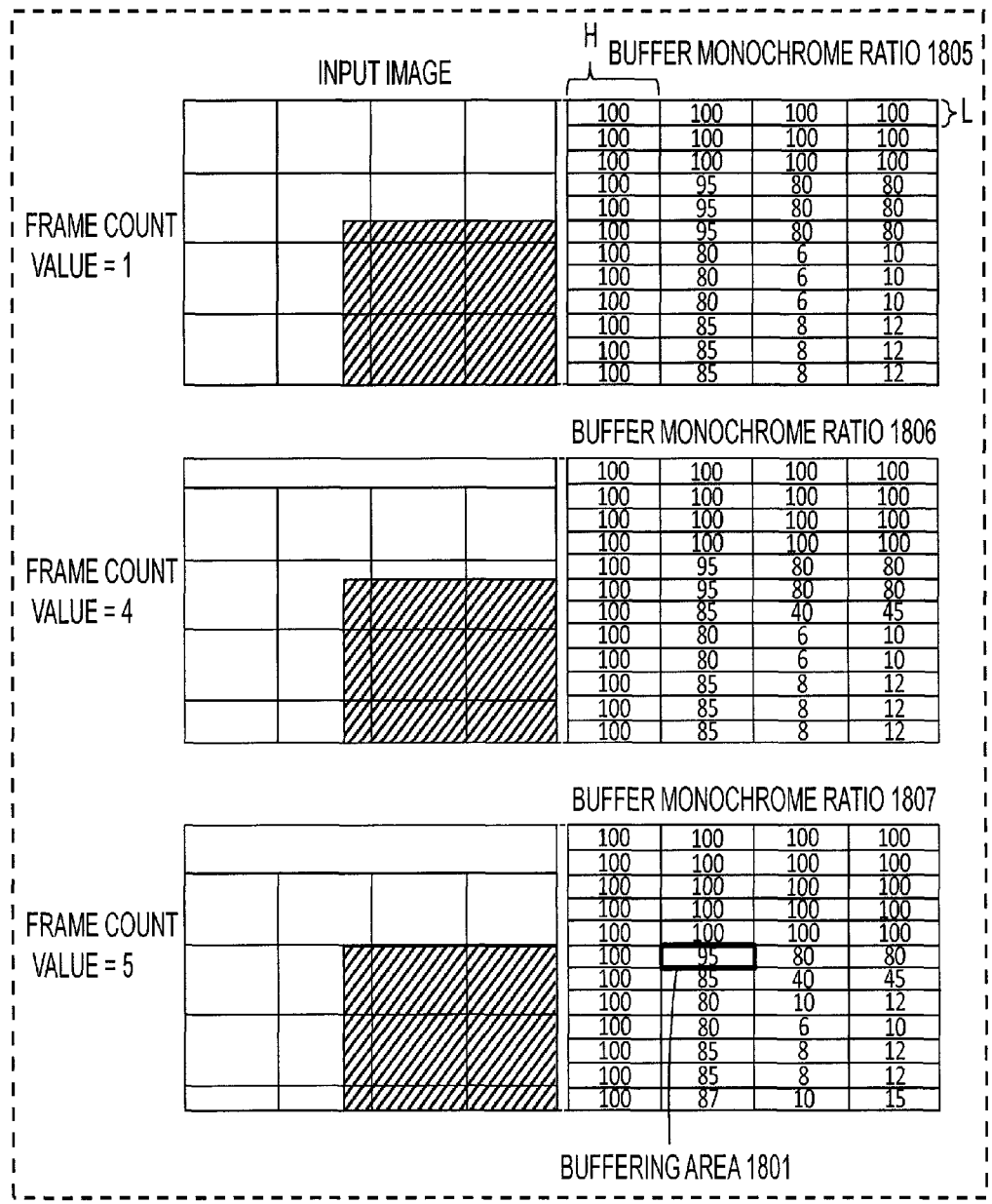

2601 (AFTER CORRECTION)
2602

2702
2701 (AFTER CORRECTION)

X-RAY IMAGE 1502
3001
ENDOSCOPE IMAGE 1501

IMAGE PROCESSING APPARATUS AND CONTROL METHOD THEREFOR

BACKGROUND OF THE INVENTION

1. Field of the Invention

The present invention relates to an image processing apparatus and a control method therefor.

2. Description of the Related Art

An image processing apparatus that segments an input image into monochrome areas (areas of a monochrome image) and color areas (areas of a color image), and performs γ correction individually for the monochrome area and the color area has been proposed. For example, an image processing apparatus that performs γ correction specified in digital imaging and communication in medicine (DICOM) Part 14 (hereafter called "DICOM γ correction") on a monochrome area and γ correction with γ=2.2 (hereafter called "2.2 γ correction") on a color area has been proposed. If this image processing apparatus is used in the case of displaying such a monochrome image as an X-ray image and such a color image as an endoscope image, DICOM γ correction is performed on the monochrome image and 2.2 γ correction is performed on the color image, so that both images can be displayed in appropriate gradation.

In some cases, some color pixels, such as a color comment, may exist in a monochrome image (e.g. X-ray image). In the same way, some monochrome pixels may exist in a color image. Therefore if each image is determined whether the image is a monochrome area or color area for each pixel, the color pixels in a monochrome image may be misjudged as a color area, or monochrome pixels in a color image may be misjudged as a monochrome area. To prevent this error, a method for determining a monochrome area or a color area for each segment area acquired by segmenting an image area has been proposed (Japanese Patent Application Laid-Open No. 2003-244469).

SUMMARY OF THE INVENTION

With the technique disclosed in Japanese Patent Application Laid-Open No. 2003-244469 however, an input image may not be segmented into monochrome areas and color areas with accuracy. In concrete terms, if a boundary between a monochrome area and a color area is located in a segment area, the boundary of the monochrome area and the color area cannot be detected accurately.

The present invention provides a technique to accurately determines a monochrome area and a color area of an input image.

An image processing apparatus according to the present invention determines a monochrome area and a color area of an input image.

The apparatus comprises:

an acquisition unit that acquires an image characteristic value of the input image; and a determination unit that determines whether each pixel group in the input image is a monochrome area or a color area based on the image characteristic value acquired by the acquisition unit, wherein the acquisition unit acquires a plurality of image characteristic values corresponding to a plurality of acquisition areas including a determination target pixel group, and the determination unit determines whether the pixel group is a monochrome area or a color area based on the plurality of image characteristic values corresponding to the plurality of acquisition areas including the pixel group.

A method according to the present invention is a method for controlling an image processing apparatus according that determines a monochrome area and a color area of an input image.

the method comprises:

an acquisition step of acquiring an image characteristic value of the input image; and a determination step of determining whether each pixel group in the input image is a monochrome area or a color area based on the image characteristic value acquired in the acquisition step, wherein in the acquisition step, a plurality of image characteristic values corresponding to a plurality of acquisition areas including the determination target pixel group are acquired, and in the determination step, whether the pixel group is a monochrome area or a color area is determined based on the plurality of image characteristic values corresponding to the plurality of acquisition areas including the pixel group.

According to the present invention, a monochrome area and a color area of an input image can be accurately determined.

Further features of the present invention will become apparent from the following description of exemplary embodiments with reference to the attached drawings.

BRIEF DESCRIPTION OF THE DRAWINGS

FIG. 11 shows an example of processing of a monochrome/color area detection unit according to Example 2;

FIG. 16 shows an example of a method for determining a type of a segment area according to Example 3;

FIG. 21 shows an example of a method for determining a type of a segment area according to Example 4;

FIG. 24 shows an example of processing of a horizontal monochrome/color area detection unit according to Example 6;

FIG. 26 shows an example of processing of a vertical monochrome/color area detection unit according to Example 6;

DESCRIPTION OF THE EMBODIMENTS

Example 1

An image processing apparatus and a method for controlling the image processing apparatus according to Example 1 of the present invention will now be described with reference to the drawings. The image processing apparatus according to this example segments an input image into monochrome areas and color areas.

Figure 1:
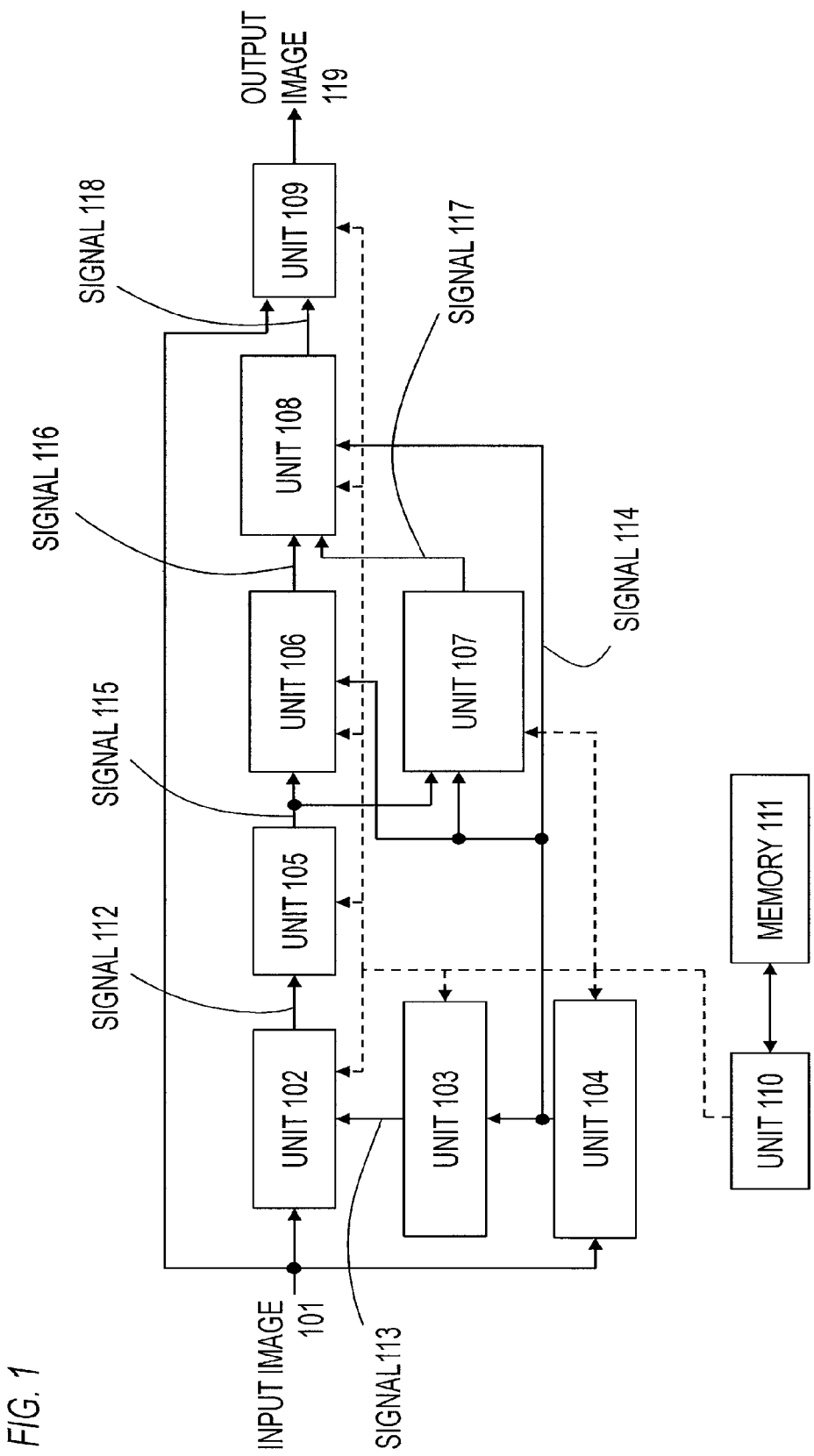
FIG. 1 is a block diagram depicting an example of a functional configuration of an image processing apparatus according to Example 1.

FIG. 1 is a block diagram depicting an example of a functional configuration of the image processing apparatus according to this example. As FIG. 1 shows, the image processing apparatus according to this example includes a histogram acquisition unit 102, a histogram acquisition area decision unit 103, a frame count value generation unit 104, a monochrome ratio calculation unit 105, a horizontal monochrome/color area detection unit 106, a vertical monochrome/color area detection unit 107, a monochrome/color area decision unit 108, a γ correction unit 109, a control unit 110 and a memory 111.

The control unit 110 is a central processing unit (CPU; computer), for example. The control unit 110 accesses the memory 111 when necessary, and controls each functional unit of the image processing apparatus.

The memory 111 is a storage device, such as a magnetic disk and a semiconductor memory. The memory 111 stores programs executed by the control unit 110 and parameters to be used for controlling each functional unit.

Figure 2A:
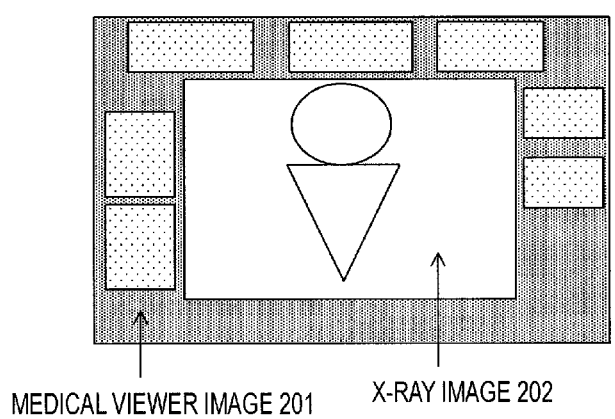
FIG. 2A and FIG. 2B show an example of an input image.

FIG. 2A shows an example of an input image 101 (input image signal) that is inputted to the image processing apparatus according to this example. In the case of FIG. 2A, the input image 101 is an image combining a medical viewer image 201 (image of the application) and an X-ray image 202 (medical image).

The medical viewer image 201 is a color image, and the X-ray image 202 is a monochrome image. An area of a color image (color area) is an area on which first image processing (e.g. γ correction with γ=2.2), and an area of a monochrome image (monochrome area) is an area on which second image processing (e.g. DICOM γ correction) is performed.

The input image is not limited to the image shown in FIG. 2A. The input image may be an image that includes only a medical image (image not including an image of the application). For example, the input image may be an endoscope image, which is a color image, and an X-ray image, which is a monochrome image, and is positioned next to the endoscope image.

The histogram acquisition unit 102 acquires an image characteristic value of an input image. In this example, a histogram of a pixel value is generated as the image characteristic value. In concrete terms, the histogram acquisition unit 102 receives a later mentioned coordinate value signal 113, and generates a histogram of a pixel value within an acquisition area indicated by the coordinate value signal 113. Then the histogram acquisition unit 102 outputs a histogram signal 112 that indicates the generated histogram.

In this example, the histogram signal 112 indicates a frequency of monochrome pixels (pixel having a color difference signal Cb=0 and a color difference signal Cr=0) in this histogram, but the histogram signal 112 is not limited to this. For example, the histogram signal 112 may indicate a frequency of each pixel value. A frequency of the pixel of Cb=0 and a frequency of the pixel of Cr=0 are counted, and a signal that indicates a mean value of these two frequency values may be outputted as the histogram signal 112. A signal that indicates a smaller value of the frequency of the pixel of Cb=0 and the frequency of the pixel of Cr=0 may be outputted as the histogram signal 112.

Figure 2B:
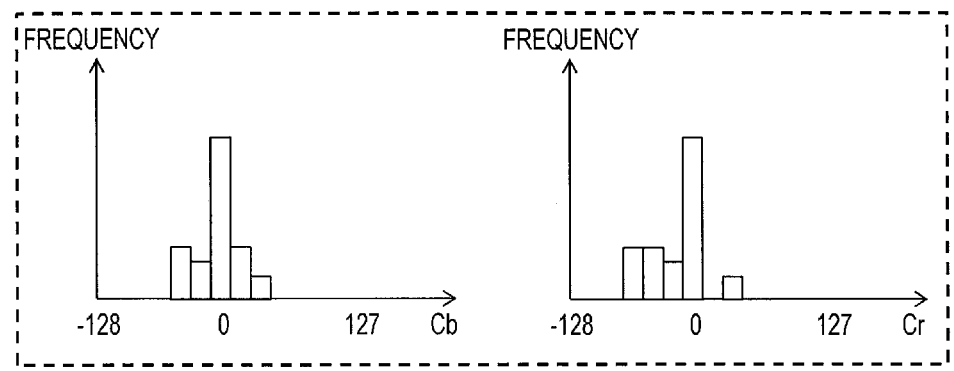

FIG. 2B are examples of the Cb histogram and the Cr histogram.

In this example, the histogram acquisition unit 102 generates a histogram based on an input image, but the histogram may be inputted (acquired) from the outside.

In this example, if the input image 101 is an RGB signal, the histogram acquisition unit 102 converts the RGB signal into a YCbCr signal once, then generates a histogram (histogram of a YCbCr value), but the present invention is not limited to this. The histogram may be a histogram of a RGB value.

The image characteristic value is not limited to a histogram of a pixel value. The image characteristic value may be any characteristic value if the characteristic value can be an index to determine whether the area is a monochrome area or a color area. For example, the image characteristic value may be a mode of a pixel value or a brightness value, or a brightness histogram, or a number of pixels of which brightness value is 0.

The frame count value generation unit 104 is a counter which is incremented by one for each frame. In this example, the frame count value generation unit 104 repeatedly counts from 1 to 5, and outputs a frame count value signal 114 that indicates a count value (frame count value).

The histogram acquisition area decision unit 103 receives the frame count value signal 114 and determines an acquisition area according to the frame count value. Then the histogram acquisition area decision unit 103 outputs a coordinate value signal 113 that indicates the determined acquisition area.

Figure 3:
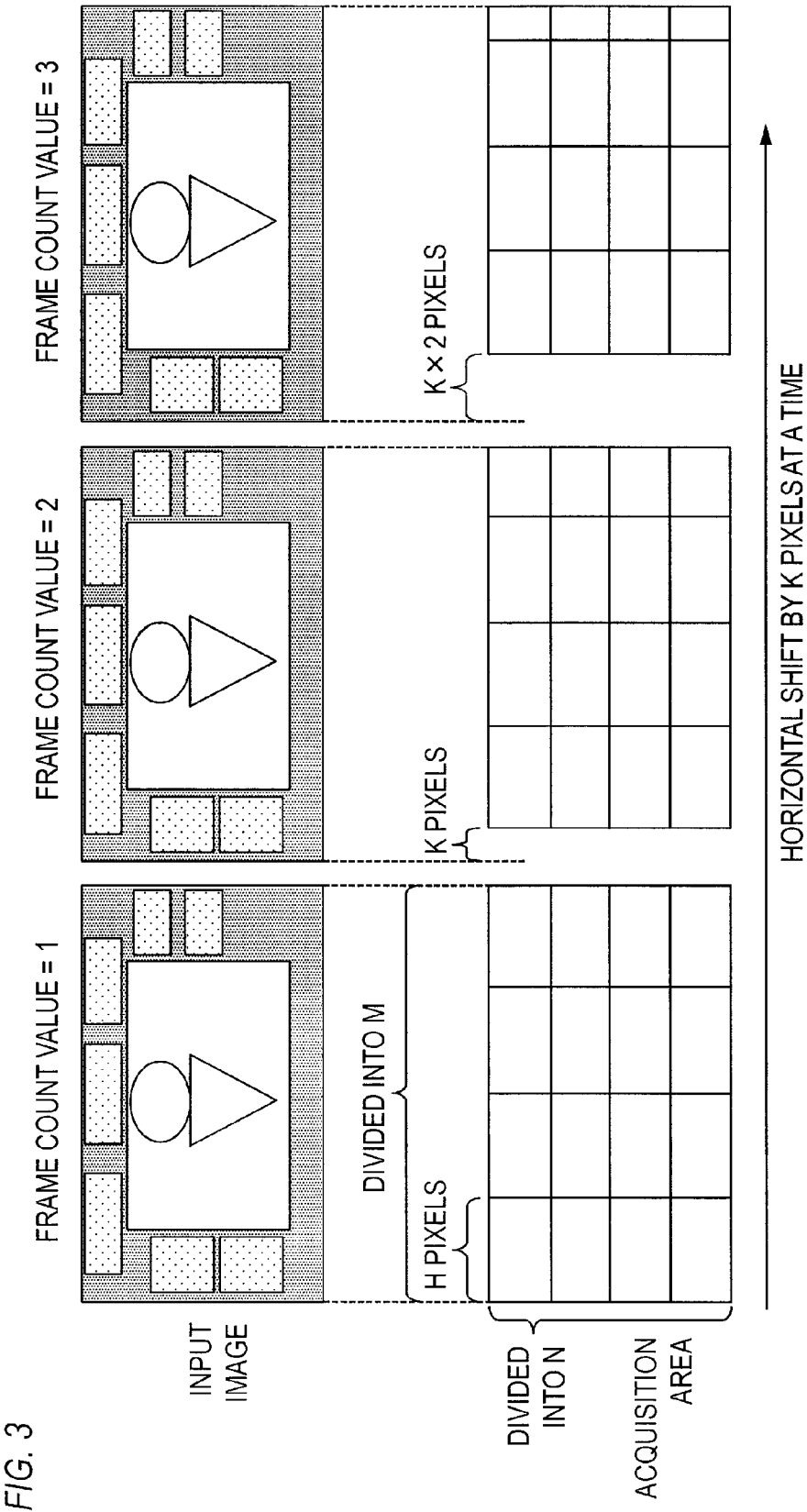
FIG. 3 shows an example of an acquisition area according to Example 1.
Figure 4:
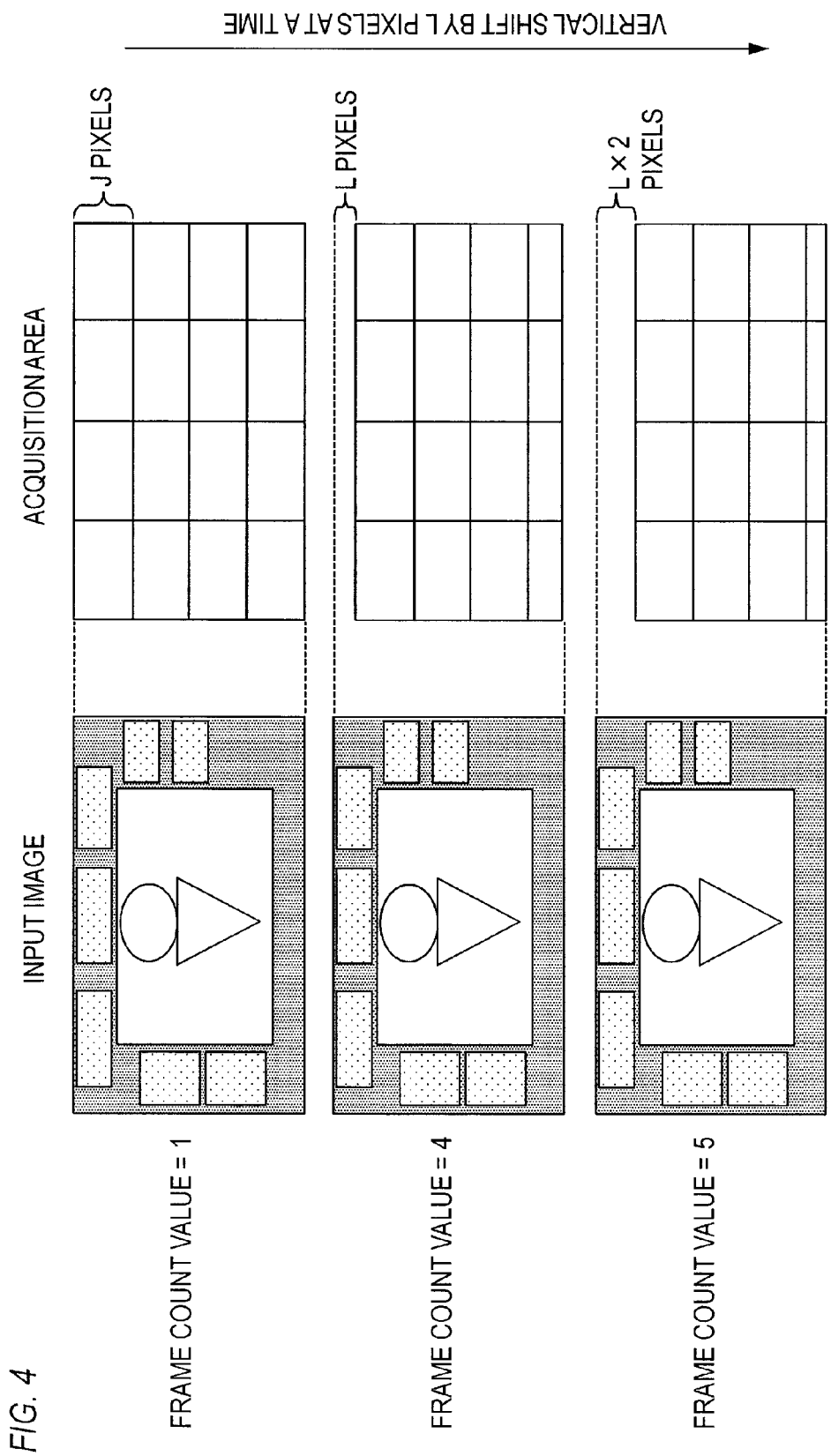
FIG. 4 shows an example of an acquisition area according to Example 1.

In concrete terms, if the frame count value is 1, each of a plurality of segment areas (predetermined areas) acquired by segmenting an area of the input image is set as an acquisition area, as shown at the left in FIG. 3 (top in FIG. 4). In this example, it is assumed that a plurality of segment areas are a plurality of areas acquired by segmenting the area of the input image in a matrix. In concrete terms, a plurality of segment areas are the M×N number of areas acquired by segmenting the area of the input image into M in the horizontal direction×N in the vertical direction (M and N are positive integers).

If the frame count is 2 as shown at the center in FIG. 3, each of a plurality of areas, which is acquired by moving the plurality of segment areas by K pixels in the horizontal direction (to the right), is set as an acquisition area respectively (K is a positive integer).

If the frame count value is 3 as shown at the right in FIG. 3, each of a plurality of areas, which is acquired by moving the plurality of segment areas by K×2 pixels in the horizontal direction (to the right), is set as an acquisition area respectively.

If the frame count value is 4 as shown at the center in FIG. 4, each of a plurality of areas, which is acquired by moving the plurality of segment areas by L pixels in the vertical direction (downward), is set as an acquisition area respectively (L is a positive integer).

If the frame count value is 5 as shown at the bottom in FIG. 4, each of a plurality of areas, which is acquired by moving the plurality of segment areas by L×2 pixels in the vertical direction (downward), is set as an acquisition area respectively.

In this example, a horizontal moving distance (value of K) is calculated using the following Expression 1. In Expression 1, H is 2 or greater integer, and is a number of pixels in the horizontal direction of the segment area (horizontal size).

$$K=H/3 \tag{Expression 1}$$

If H is not divisible by 3, decimals can be rounded. Thereby an integer not less than 1 and less than H can be acquired as K.

In this example, a vertical moving distance (value of L) is calculated using the following Expression 2. In Expression 2, J is 2 or greater integer, and is a number of pixels in the vertical direction of the segment area (vertical size).

$$L=J/3 \tag{Expression 2}$$

If J is not divisible by 3, decimals can be rounded. Thereby an integer greater than 1 and less than J can be acquired as L.

The moving distance is not limited to the values acquired by Expressions 1 and 2. The moving distance can be any value, as long as the value is smaller than the size of the predetermined area.

As described in detail later, according to this example, whether an area is a monochrome area or a color area is determined for each first pixel group, constituted by K pixels×J pixels, and whether an area is a monochrome area or a color area is determined for each second pixel group, constituted by H pixels×L pixels. Then based on these determination results, the final determination result whether the area is a monochrome area or a color area can be acquired. As a result, the input image can be segmented into monochrome areas and color areas for each pixel group constituted by K pixels×L pixels.

In this example, by determining an acquisition area as mentioned above, a histogram having a pixel value within the acquisition area is generated for each of a plurality of acquisition areas, including a determination target pixel group.

The monochrome ratio calculation unit 105 receives a histogram signal 112, and calculates a monochrome ratio for each histogram. Then the monochrome ratio calculation unit 105 outputs a monochrome ratio signal 115 that indicates the monochrome ratio of each histogram.

The monochrome ratio is a ratio of the frequency of the monochrome pixel of the histogram to the total frequency of the histogram. In this example, the frequency of the monochrome pixels is divided by a total frequency of the histogram (H×J), and is normalized so that the maximum value becomes 100. In this way, the monochrome ratio is calculated.

Based on the histogram acquired by the histogram acquisition unit 102, the horizontal monochrome/color area detection unit 106, the vertical monochrome/color area detection unit 107 and the monochrome/color area decision unit 108 determine whether each pixel group in the input image is a monochrome area or a color area. In this example, if a determination target pixel group is included in a plurality of acquisition areas, it is determined whether the determination target pixel group is a monochrome area or a color area based on a plurality of histograms acquired for the plurality of acquisition areas. If the determination target pixel group is included only in one acquisition area, it is determined whether the determination target pixel group is a monochrome area or a color area based on one histogram acquired for the acquisition area.

If an input image has a color background, the horizontal monochrome/color area detection unit 106, the vertical monochrome/color area detection unit 107 and the monochrome/color area decision unit 108 detect and determine monochrome areas. In concrete terms, the monochrome ratio calculation unit 105 determines that the input image has a color background if a predetermined number (e.g. 7) or more segment areas, out of the outermost twelve segment areas, are color areas based on the monochrome ratio 603 of each segment area which was calculated when the frame count value is 1. The monochrome ratio calculation unit 105 transfers the determination result to the horizontal monochrome/color area detection unit 106, the vertical monochrome/color area detection unit 107 and the monochrome/color area determination unit 108, where monochrome areas are detected and determined. On the other hand, if less than a predetermined number (e.g. 7) of areas, out of the outermost twelve segment areas, are color areas (e.g. 6 or more monochrome areas) based on the monochrome ratio 603 of each segment area which was calculated when the frame count value is 1, the monochrome ratio calculation unit 105 determines that the input image has a monochrome background. The monochrome ratio calculation unit 105 transfers the determination result to the horizontal monochrome/color area detection unit 106, the vertical monochrome/color area detection unit 107 and the monochrome/color area decision unit 108, where the color areas are detected and determined.

In this example, a case when the horizontal monochrome/color area detection unit 106, the vertical monochrome/color area detection unit 107 and the monochrome/color area decision unit 108 detect and determine monochrome areas for an input image having a color background will be described in detail. Detailed description on the processing for an input image having a monochrome background will be omitted since the same concept as below can be applied.

The horizontal monochrome/color area detection unit 106 receives a monochrome ratio signal 115 and a frame count value signal 114. Then the horizontal monochrome/color area detection unit 106 detects a horizontal monochrome area using a plurality of monochrome ratios (a plurality of monochrome ratios calculated based on the histograms) for a plurality of segment areas and a plurality of areas determined by moving the plurality of segment areas in the horizontal direction.

Figure 5:
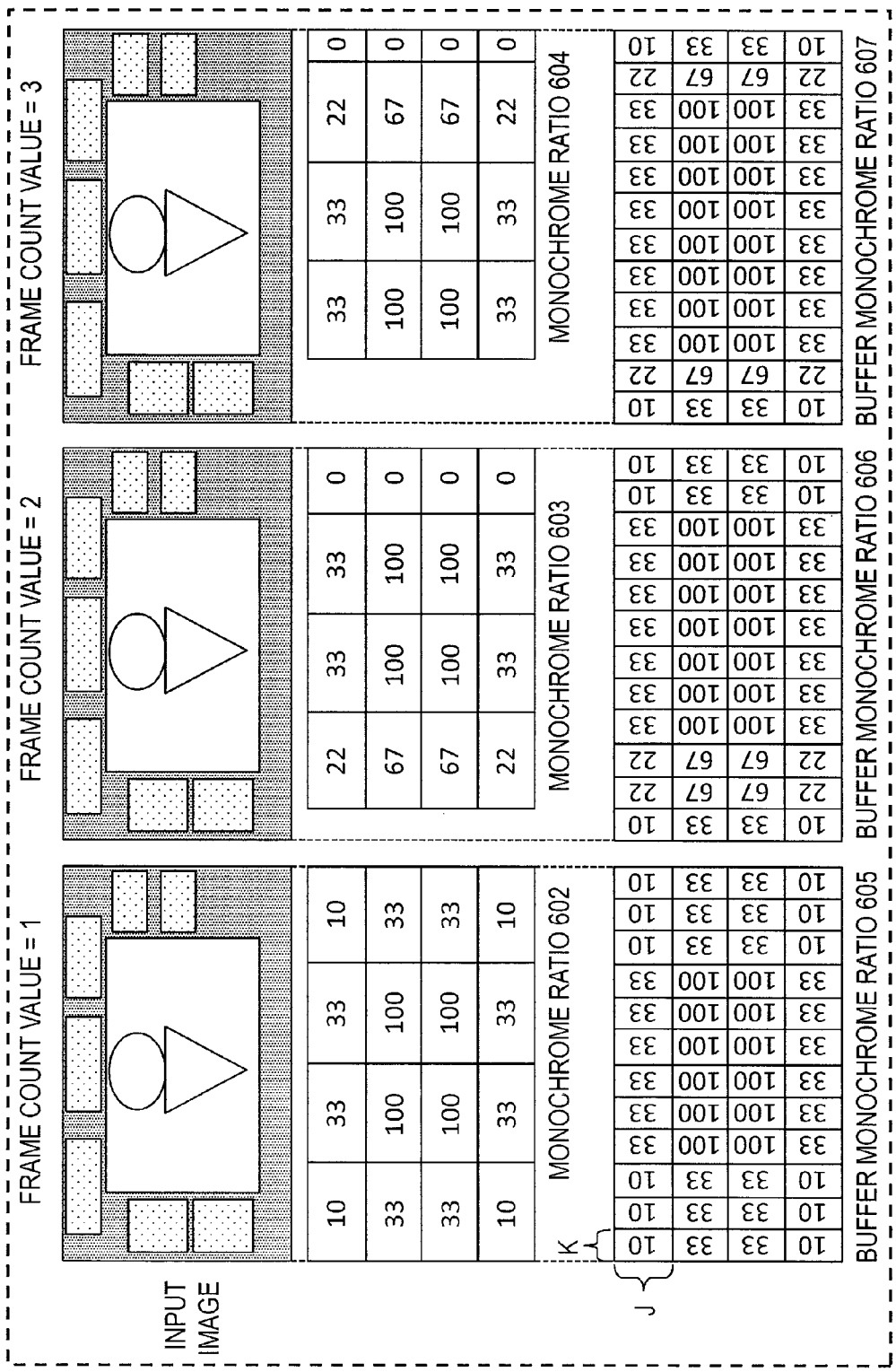
FIG. 5 shows an example of processing of a horizontal monochrome/color area detection unit according to Example 1.

In concrete terms, first the horizontal monochrome/color area detection unit 106 acquires a monochrome ratio 602 which was calculated when the frame count value is 1, as shown in FIG. 5. In FIG. 5, a numeric value written in each acquisition area indicates a monochrome ratio of this acquisition area. Then the horizontal monochrome/color area detection unit 106 buffers the acquired monochrome ratio 602 as a monochrome ratio (buffer monochrome ratio 605) for each area constituted by K pixels in the horizontal direction×J pixels in the vertical direction (buffering area: first pixel group). In FIG. 5, a numeric value written in each buffering area indicates a buffer monochrome ratio of this buffering area.

Here the buffer monochrome ratio 605 is determined using the following Expression 3. The buffer monochrome ratio 605 (i, j) is a buffer monochrome ratio of the buffering area located in the (i+1)th from the left in the horizontal direction, and in the (j+1)th from the top in the vertical direction. The monochrome ratio 602 (i/3, j) is a monochrome ratio of an acquisition area located in the (i/3+1)th from the left in the horizontal direction (decimals of i/3 are rounded down) and in the (j+1)th from the top in the vertical direction.

Buffer monochrome ratio 605($i,j$)=monochrome ratio 602($i/3,j$), where $i$=an integer in a range of 0 to $M$×3−1, and $j$=an integer in a range of 0 to $N$−1    (Expression 3)

Then the horizontal monochrome/color area detection unit 106 acquires a monochrome ratio 603 which was calculated when the frame count value is 2. Then the horizontal monochrome/color area detection unit 106 buffers the acquired monochrome ratio 603 as a monochrome ratio (buffer monochrome ratio 606) for each buffering area.

Here for buffering, processing to update the already buffered buffer monochrome ratio 605 (i, j) is performed. In concrete terms, a higher value out of the monochrome ratio 603 ((i−1)/3, j) and the buffer monochrome ratio 605 (i, j) is regarded as the buffer monochrome ratio 606 (i, j), as shown in Expression 4. For the buffer monochrome ratio 606 (0, j), the value of the buffer monochrome ratio 605 (0, j) is used.

Buffer monochrome ratio 606($i,j$)=MAX (monochrome ratio 603(($i$−1)/3,$j$), buffer monochrome ratio 605($i,j$)) where $i$=an integer in a range of 1 to $M$×3−1, and $j$=an integer in a range of 0 to $N$−1   (Expression 4)

Then the horizontal monochrome/color area detection unit 106 acquires a monochrome ratio 604 which was calculated when the frame count value is 3. Then the horizontal monochrome/color area detection unit 106 buffers the acquired monochrome ratio 604 as a monochrome ratio (buffer monochrome ratio 607) for each buffering area.

Here for the buffering, processing to update the already buffered buffer monochrome ratio 606 (i, j) is performed, as shown in Expression 5. For the buffer monochrome ratio 607 (0, j) and the buffer monochrome ratio 607 (1, j), the value of the buffer monochrome ratio 606 (0, j) and the value of the buffer monochrome ratio 606 (1, j) are used.

Buffer monochrome ratio 607 ($i, j$)=MAX (monochrome ratio 604 (($i$−2)/3, $j$), buffer monochrome ratio 606 ($i, j$)), where $i$=an integer in a range of 2 to $M$×3−1, and $j$=an integer in a range of 0 to $N$−1   (Expression 5)

Then the horizontal monochrome/color area detection unit 106 determines, for each buffering area (for each first pixel group), whether the buffering area is a monochrome area or a color area, based on the buffer monochrome ratio 607 of the buffering area. Then the horizontal monochrome/color area detection unit 106 detects, as a horizontal monochrome area, an area constituted by a buffering area determined as a monochrome area. In concrete terms, an area constituted by a buffering area of which buffer monochrome ratio 607 is a predetermined threshold or more, is detected as a horizontal monochrome area. In this example, the predetermined threshold is set to 95. Thereby even if some color pixels (a number of color pixels that is less than 5% of the total frequency of the histogram) are included in the acquired area, the color pixels are regarded as color comment characters in the monochrome image, and this acquisition area can be determined as a monochrome area.

Figure 6A:
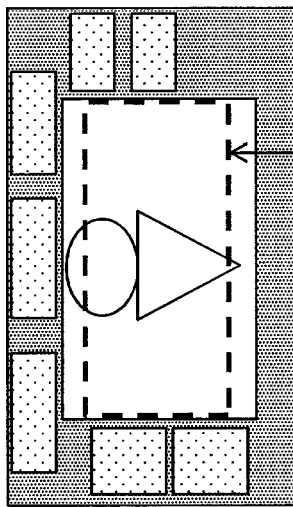
FIG. 6A to FIG. 6D show an example of a method for determining a monochrome area according to Example 1.

As a result, as FIG. 6A shows, the horizontal monochrome area 701 is detected.

The horizontal monochrome/color area detection unit 106 outputs a signal that indicates a horizontal monochrome area as a horizontal monochrome area signal 116.

Thus according to this example, for each pixel group, the monochrome ratio calculated from each of a plurality of image characteristic values corresponding to a plurality of acquisition areas including the pixel group is buffered in association with the pixel group. Then for each pixel group, it is determined whether this pixel group is a monochrome area or a color area, according to the highest value of a plurality of monochrome ratios buffered in association with the pixel group.

By this processing, a monochrome area (horizontal monochrome area) can be detected more accurately than prior art. In concrete terms, a pixel group (first pixel group), constituted by K pixels in the horizontal direction×J pixels in the vertical direction, is a target of determining whether this area is a horizontal monochrome area or not, and the determination is performed based on a plurality of monochrome ratios for a plurality of acquisition areas including the determination target pixel group. As a result, the determination can be performed more accurately than determination based on one histogram (one monochrome ratio).

In this example, the determination is performed for each unit of K pixels in the horizontal direction×J pixels in the vertical direction, hence the boundary along the vertical direction (boundary of a monochrome image and a color image) can be more accurately detected than performing the determination for each unit of a segment area (H pixels in the horizontal direction×J pixels in the vertical direction).

The difference of image processing (e.g. considering the γ value) is more clearly seen in an image in a monochrome area than in a color area. In this example, the determination is performed based on the highest monochrome ratio out of a plurality of monochrome ratios in a plurality of acquisition areas including the target pixel group, which is determined based on whether this pixel group is a horizontal monochrome area or not. Therefore a pixel group, including pixels of a color area and pixels of a monochrome area, can be more easily determined as a monochrome area, and omission of a monochrome area due to a detection error can be decreased.

The vertical monochrome/color area detection unit 107 receives a monochrome ratio signal 115 and a frame count value signal 114. Then the vertical monochrome/color area detection unit 107 detects a vertical monochrome area using a plurality of monochrome ratios (a plurality of monochrome ratios calculated based on histograms) for a plurality of segment areas and a plurality of areas determined by moving the plurality of segment areas in the vertical direction.

Figure 7:
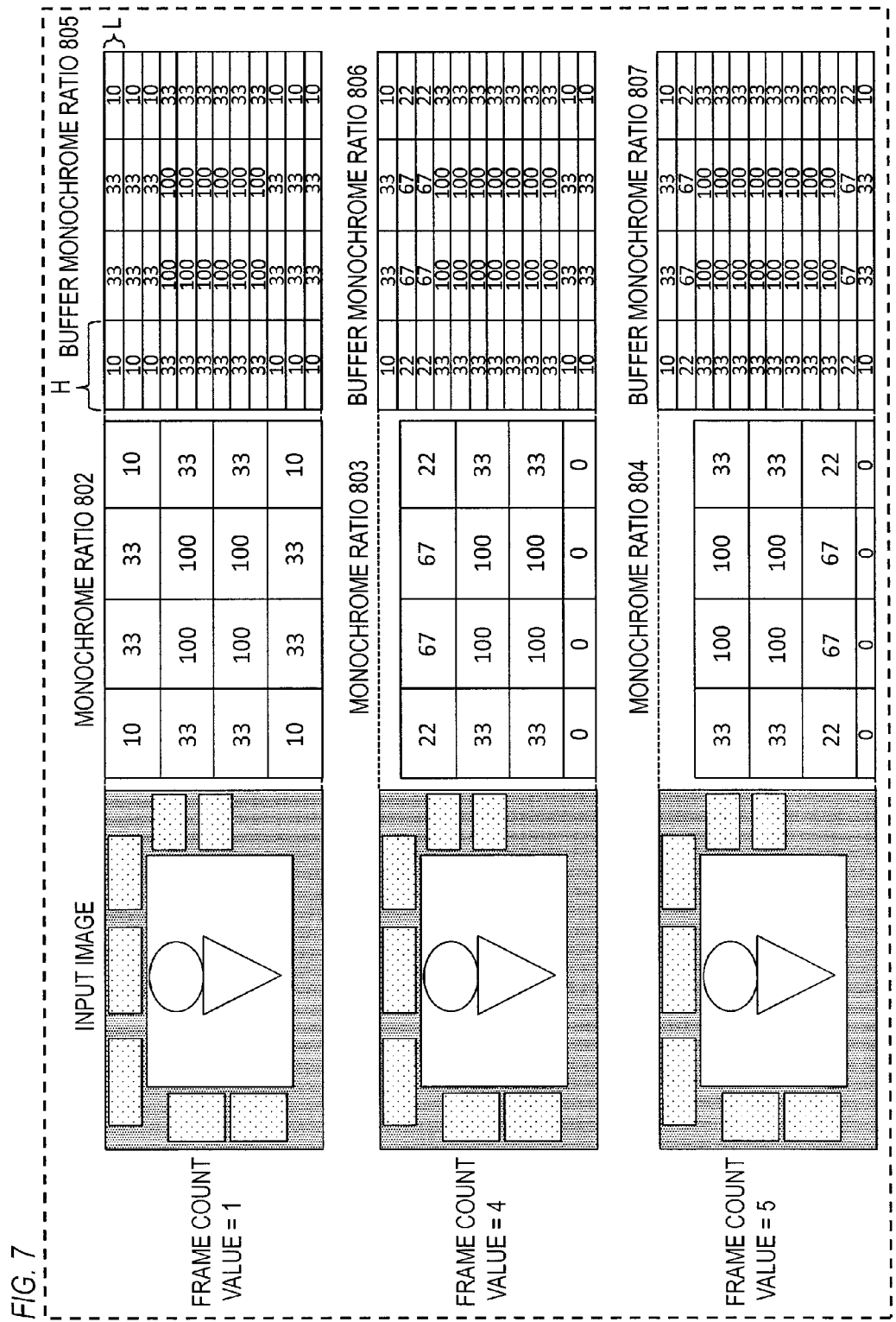
FIG. 7 shows an example of processing of a vertical monochrome/color area detection unit according to Example 1.

In concrete terms, first the vertical monochrome/color area detection unit 107 acquires a monochrome ratio 802 which was calculated when the frame count value is 1, as shown in FIG. 7. In FIG. 7, a numeric value written in each acquisition area indicates a monochrome ratio of this acquisition area. Then the vertical monochrome/color area detection unit 107 buffers the acquired monochrome ratio 802 as a monochrome ratio (buffer monochrome ratio 805) for each area constituted by H pixels in the horizontal direction×L pixels in the vertical direction (buffering area: second pixel group). In FIG. 7, a numeric value written in each buffering area indicates a buffer monochrome ratio of this buffering area.

Here the buffer monochrome ratio 805 is determined using the following Expression 6. The buffer monochrome ratio 805 (i, j) is a buffer monochrome ratio of the buffering area located in the (i+1)th from the left in the horizontal direction and in the (j+1)th from the top in the vertical direction. The monochrome ratio 802 (i, j/3) is a monochrome ratio of an acquisition area located in the (i+1)th from the left in the horizontal direction and in the (j/3+1)th from the top in the vertical direction (decimals of j/3 are rounded down).

Buffer monochrome ratio 805($i,j$)=monochrome ratio 802($i,j/3$),where $i$=an integer in a range of 0 to $M-1$,and $j$=an integer in a range of 0 to $N\times 3-1$ (Expression 6)

Then the vertical monochrome/color area detection unit 107 acquires a monochrome ratio 803 which was calculated when the frame count value is 4. Then the vertical monochrome/color area detection unit 107 buffers the acquired monochrome ratio 803 as a monochrome ratio (buffer monochrome ratio 806) for each buffering area.

Here for buffering, processing to update the already buffered buffer monochrome ratio 805 (i, j) is performed. In concrete terms, a higher value, out of the monochrome ratio 803 (i, (j−1)/3) and the buffer monochrome ratio 805 (i, j), is regarded as the buffer monochrome ratio 806 (i, j), as shown in Expression 7. For the buffer monochrome ratio 806 (i, 0), the value of the buffer monochrome ratio 805 (i, 0) is used.

Buffer monochrome ratio 806($i,j$)=MAX (monochrome ratio 803($i,(j-1)/3$),buffer monochrome ratio 805($i,j$)), where $i$=an integer in a range of 0 to $M-1$,and $j$=an integer in a range of 1 to $N\times 3-1$ (Expression 7)

Then the vertical monochrome/color area detection unit 107 acquires a monochrome ratio 804 which was calculated when the frame count value is 5. Then the vertical monochrome/color area detection unit 107 buffers the acquired monochrome ratio 804 as a monochrome ratio (buffer monochrome ratio 807) for each buffering area.

Here for buffering, processing to update the already buffered buffer monochrome ratio 806 (i, j) is performed, as shown in Expression 8. For the buffer monochrome ratio 807 (i, 0) and the buffer monochrome ratio 807 (i, 1), the value of the buffer monochrome ratio 806 (i, 0) and the buffer monochrome ratio 806 (i, 1) are used.

Buffer monochrome ratio 807 ($i, j$)=MAX (monochrome ratio 804 ($i, (j-2)/3$), buffer monochrome ratio 806 ($i, j$)), where $i$=an integer in a range of 0 to M −1, and $j$=an integer in a range of 2 to $N\times 3-1$ (Expression 8).

Then the vertical monochrome/color area detection unit 107 determines, for each buffering area (for each second pixel group), whether the buffering area is a monochrome area or a color area, based on the buffer monochrome ratio 807 of the buffering area. Then the vertical monochrome/color area detection unit 107 detects, as a vertical monochrome area, an area constituted by a buffering area determined as a monochrome area. In concrete terms, an area constituted by a buffering area of which buffer monochrome ratio 807 is a predetermined threshold or more, is detected as a vertical monochrome area. In this example, the predetermined threshold is set to 95. The threshold used for detecting a horizontal monochrome area and the threshold used for detecting a vertical monochrome area may be the same or may be different.

Figure 6B:

As a result, as FIG. 6B shows, the vertical monochrome/color area 901 is detected.

The vertical monochrome/color area detection unit 107 outputs a signal that indicates a vertical monochrome area as a vertical monochrome area signal 117.

By this processing, a monochrome area (vertical monochrome area) can be detected more accurately than prior art. In concrete terms, a pixel group (second pixel group), constituted by H pixels in the horizontal direction×L pixels in the vertical direction, is a target of determining whether this area is a vertical monochrome area or not, and the determination is performed based on a plurality of monochrome ratios for a plurality of acquisition areas including the determination target pixel group. As a result, the determination can be performed more accurately than determination based on one histogram (one monochrome ratio).

A monochrome area and a color area are mostly rectangular. In this example, the determination is performed for each unit of H pixels in the horizontal direction×L pixels in the vertical direction, hence the boundary along the horizontal direction (boundary of a monochrome image and a color image) can be more accurately detected than performing the determination for each unit of a segment area (H pixels in the horizontal direction×J pixels in the vertical direction).

Furthermore in this example, the determination is performed based on the highest monochrome ratio, out of a plurality of monochrome ratios in a plurality of acquisition areas including the target pixel group, for which it is determined whether this pixel group is a vertical monochrome area or not. Therefore a pixel group including pixels of a color area and pixels of a monochrome area can be easily determined as a monochrome area, and omission of a monochrome area due to a detection error can be decreased.

Figure 6C:
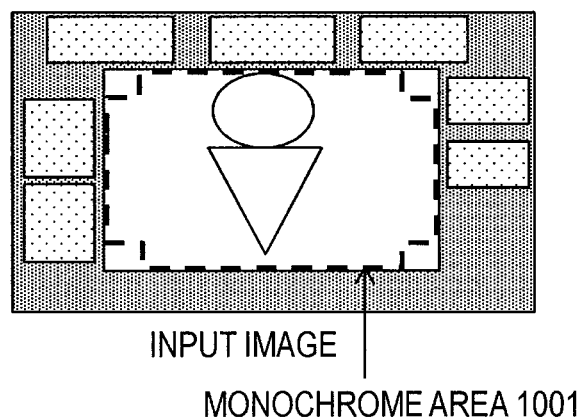

The monochrome/color area decision unit 108 receives a horizontal monochrome area signal 116 and a vertical monochrome area signal 117, and determines a monochrome area based on these signals. In concrete terms, as FIG. 6C shows, an OR area of a horizontal monochrome area 701 and a vertical monochrome area 901 are regarded as a (final) monochrome area 1001. The rest of the area is regarded as a color area.

The monochrome/color area decision unit 108 outputs a signal that indicates a monochrome area as a monochrome area signal 118.

Figure 6D:
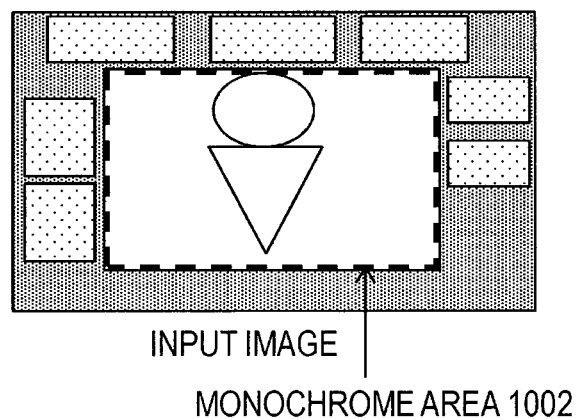

The monochrome/color area decision unit 108 determines the sizes of the concave portions at the upper right corner, lower right corner, upper left corner and lower left corner of the monochrome area 1001, and if the size of a concave portion is the predetermined size or less, the concave portion may be replaced with a monochrome area. For example, if each concave portion has K pixels or less in the horizontal direction and L pixels or less in the vertical direction, the concave portion is replaced with a monochrome area. In this case, the monochrome area 1002 is determined as shown in FIG. 6D.

Therefore in this example, the determination is performed based on a plurality of monochrome ratios for a plurality of acquisition areas including the determination target pixel group. As a result, the determination can be performed more accurately than determination based on one histogram (one monochrome ratio).

In this example, the determination is performed for each unit of K pixels in the horizontal direction×J pixels in the vertical direction, hence the boundary along the horizontal direction (boundary of a monochrome image and a color image) can be more accurately detected than performing the determination for each unit of a segment area (H pixels in the horizontal direction×J pixels in the vertical direction). Furthermore, the determination is performed for each unit of H pixels in the horizontal direction×L pixels in the vertical direction, hence the boundary along the vertical direction can be more accurately detected than performing the determination for each unit of a segment area (H pixels in the horizontal direction×J pixels in the vertical direction). By regarding the OR area of the horizontal monochrome area and the vertical monochrome area as the final monochrome area, the boundary along the horizontal direction and the boundary along the vertical direction can be more accurately detected than performing the determination for each unit of a segment area (H pixels in the horizontal direction×J pixels in the vertical direction).

Furthermore in this example, the determination is performed based on the highest monochrome ratio, out of a plurality of monochrome ratios in a plurality of acquisition areas including the target pixel group, for which it is determined whether this pixel group is a monochrome area or not. Therefore a pixel group including pixels of a color area and pixels of a monochrome area can be easily determined as a monochrome area, and omission of a monochrome area due to a detection error can be decreased.

In this example, the final monochrome area and color area are determined based on the signals that indicate the horizontal monochrome area 701 and the vertical monochrome area 901, but the present invention is not limited to this configuration. For example, the monochrome/color area decision unit 108 may receive a histogram signal or a mono chrome ratio signal. Then the monochrome/color area decision unit 108 may determine, for each pixel group constituted by K pixels×L pixels, whether this pixel group is a monochrome area or a color area based on the received signal.

The γ correction unit 109 receives a monochrome area signal 118 and performs γ correction on the input image 101 based on the monochrome area signal 118. In concrete terms, DICOM γ correction is performed on a monochrome area indicated by the monochrome area signal 118, and γ correction with γ=2.2 is performed on the other area (color area). Then the γ correction unit 109 outputs an input image, on which the image processing (γ correction) was performed, as an output image (output image signal 119.

In this example, a case when the image processing is γ correction was described as an example, the image processing is not limited to γ correction. For example, the image processing may be brightness adjustment processing for a monochrome area and brightness adjustment processing for a color area. The image processing may also be color temperature adjustment processing for a monochrome area, and color temperature adjustment processing for a color area.

As described above, according to this example, the determination is performed based on a plurality of histograms on a plurality of acquisition areas including the target pixel group, for which it is determined whether this area is a monochrome area or a color area. As a result, the determination can be performed more accurately than determination based on one histogram for the determination target pixel group, and the input image can be accurately segmented into a monochrome area and a color area. For example, determination errors, when determining an area of color comment characters as a color area, can be decreased.

Further, according to this example, a plurality of acquisition areas is a plurality of segment areas, a plurality of areas acquired by moving the plurality of segment areas by K pixels and K×2 pixels in the horizontal direction, and a plurality of areas acquired by moving the plurality of segment areas by L pixels and L×2 pixels in the vertical direction. The boundary of a monochrome area and a color area can be more accurately detected as the values of K and L become smaller. For example, if the moving distance in the horizontal direction and the moving distance in the vertical direction are one pixel, then the boundary can be detected in pixel units. However as the values of K and L become smaller, processing load increases, so the values of K and L are set considering processing accuracy and processing load.

Furthermore, according to this example, an input image is segmented into a monochrome area and a color area during five frame periods, but the present invention is not limited to this configuration. An input image may be segmented into a monochrome area and a color area during one frame period. For example, monochrome ratios 602 to 604 and 802 to 804 are acquired during one frame period, and a monochrome area may be determined based on the monochrome ratios 602 to 604 and 802 to 804 using a method similar to the above mentioned method.

A histogram of each acquisition area may be acquired by the following method.

Figure 8:
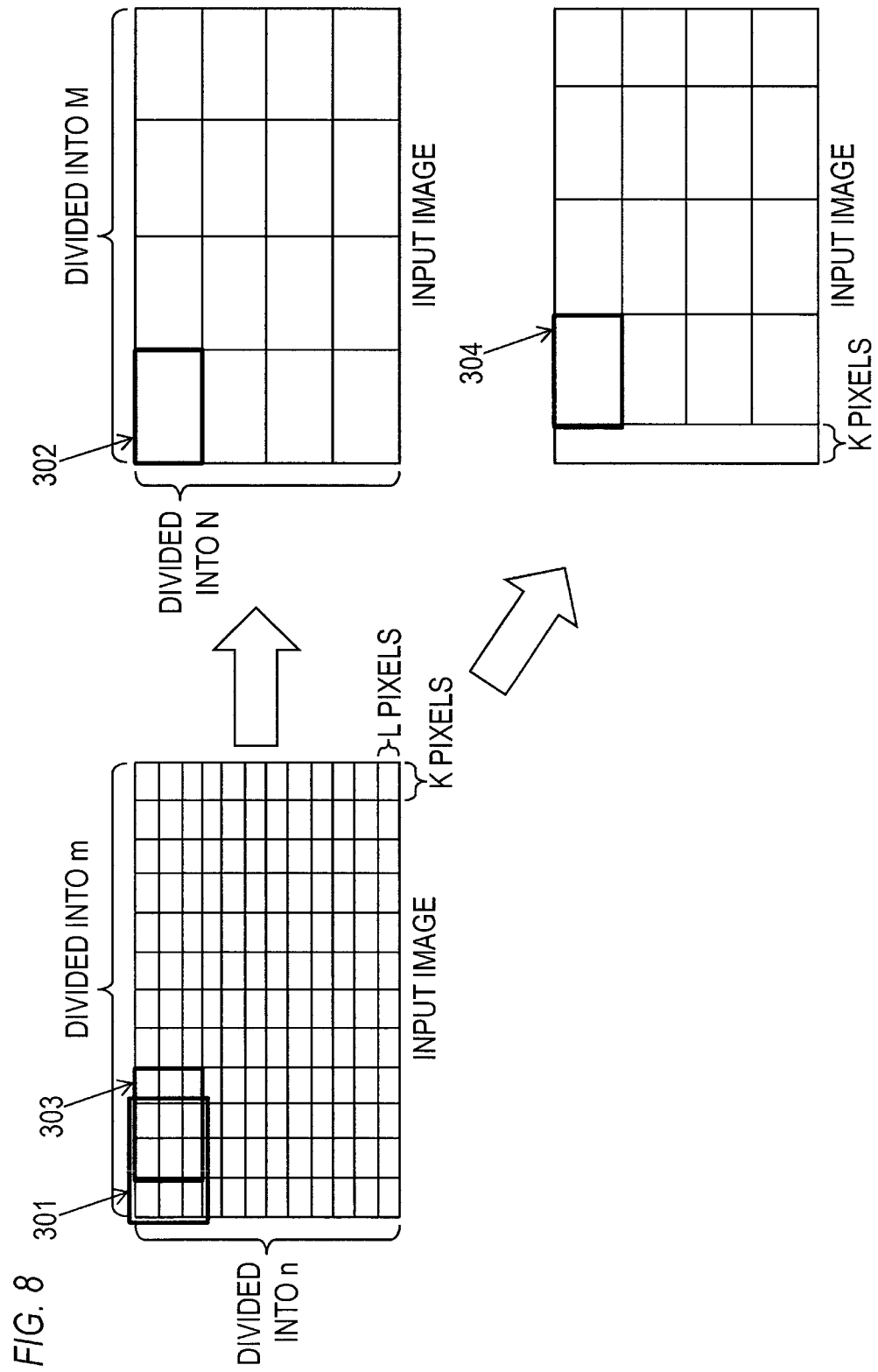
FIG. 8 shows an example of a method for acquiring a histogram of an acquisition area.

As FIG. 8 shows, for each of a plurality of sub-segment areas, which is a plurality of areas acquired by segmenting an area of an input image and is smaller than each acquisition area, a histogram of a pixel value in a sub-segment area may be acquired. In the case of FIG. 8, a plurality of sub-segment areas is 9×M×N number of areas acquired by segmenting an input image into m (=3×M) in the horizontal direction, and into n (=3×N) in the vertical direction.

As FIG. 8 shows, a histogram of an acquisition area may be generated by combining the histograms of a plurality of sub-segment areas in the acquisition area. Thereby a histogram of each acquisition area can be acquired. For example, a histogram of a segment area 302 at the upper left corner can be acquired by combining histograms of 3×3 sub-segment areas 301 located at the upper left corner. A histogram of an area 304 at the upper left corner, out of a plurality of areas acquired by moving the plurality of sub-areas by K pixels in the horizontal direction, can be acquired by combining the histograms of 3×3 sub-segment areas 303 where the sub-segment area, which is second from the left and first from the top, is located at the upper left corner. To combine histograms, the histograms may be added or an average histogram may be generated, or a representative histogram may be selected.

In this example, as a value to indicate a ratio of the frequency of monochrome pixels in the histogram with respect to the total frequency of the histogram, the monochrome ratio is calculated by dividing the frequency of the monochrome pixels by the total frequency of the histogram, and normalizing the result so that the maximum value becomes 100. However the value to indicate the ratio of the monochrome pixels of the histogram with respect to the total frequency of the histogram is not limited to this monochrome ratio. For example, the monochrome ratio may be a value generated by dividing the frequency of the monochrome pixels by the total frequency of the histogram (value before normalization). The value to indicate the ratio of the frequency of the monochrome pixels of the histogram with respect to the total frequency of the histogram may be a color ratio generated by dividing the frequency of the color pixels by the total frequency of the histogram, and normalizing the result so that the maximum value becomes 100. The color ratio may be a value generated by dividing the frequency of the color pixels by the total frequency of the histogram. If the color ratio is used as a value to indicate the ratio of frequency of the monochrome pixels of the histogram with respect to the total frequency of the histogram, the color ratio for each buffering area (buffer color ratio) can be buffered. When a color ratio of a buffering area is buffered, if a color ratio of a buffering area has already been buffered, a smaller color ratio value out of these color ratio values can be regarded as the color ratio of this buffering area.

In this example, the monochrome ratio is calculated based on the image characteristic value, and it is determined whether the determination target pixel group is a monochrome area or a color area according to the monochrome ratio, but the present invention is not limited to this. For example, whether the determination target pixel group is a monochrome area or a color area may be determined depending on the image characteristic value, without calculating the monochrome ratio.

In this example, the predetermined area is a segment area acquired by segmenting an input image, but the present invention is not limited to this. For example, the predetermined area may be an area acquired by segmenting an area on a screen of a display device which displays an output image outputted from the γ correction unit 109. If the display device is a display device that displays an image by transmitting light emitted from a light source apparatus (light source apparatus equipped in the display device), such as a case of a liquid crystal display, the predetermined area may be an area acquired by segmenting a light emitting area of the light source apparatus.

The display device and the image processing apparatus may be integrated or separated.

In this example, a predetermined area and a plurality of areas acquired by moving the predetermined area are used as the acquisition areas, but the present invention is not limited to this. In other words, in this example, the predetermined area is moved a plurality of times, but the present invention is not limited to this. For example, a number of times of moving the predetermined area may be once. Further, any acquisition areas may be set only if a plurality of acquisition areas are set for each pixel group, so as to include the pixel group. For example, in a plurality of acquisition areas including one pixel group, at least a part of the acquisition areas may have a different size from that of the other acquisition areas. A plurality of acquisition areas, of which sizes are different from one another, may be located in a same position.

The monochrome/color area decision unit 108 may determine the horizontal monochrome areas of monochrome areas and the other areas as color areas. The monochrome/color area decision unit 108 may determine the vertical monochrome areas as monochrome areas and the other areas as color areas.

Example 2

An image processing apparatus and a method for controlling the image processing apparatus according to Example 2 of the present invention will now be described with reference to the drawings.

In Example 1, a plurality of segment areas, a plurality of areas acquired by moving the plurality of segment areas in the horizontal direction, and a plurality of areas acquired by moving the plurality of segment areas in the vertical direction are used as a plurality of acquisition areas. In this example, a plurality of segment areas and a plurality of areas acquired by diagonally moving the plurality of segment areas are used as a plurality of acquisition areas.

Figure 9:
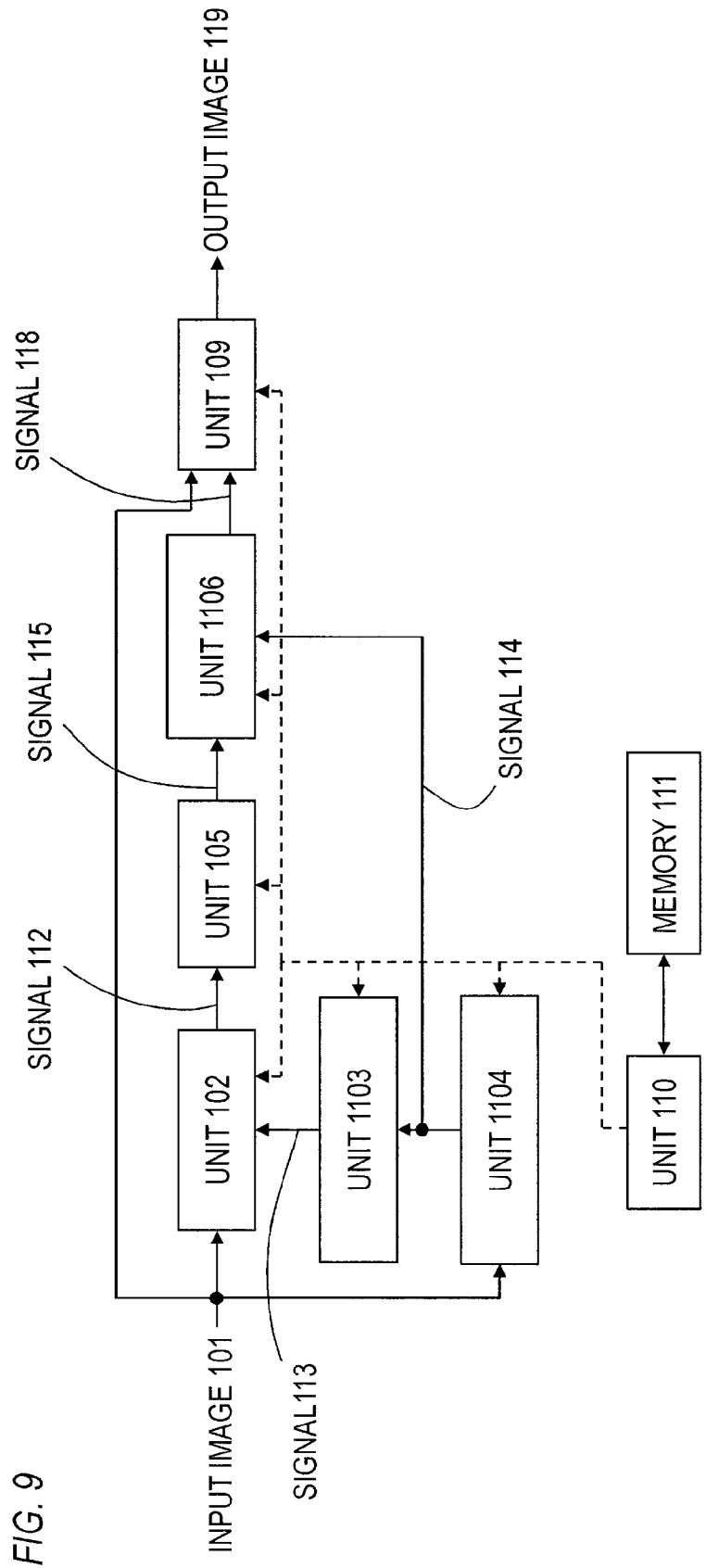
FIG. 9 is a block diagram depicting an example of a functional configuration of an image processing apparatus according to Example 2.

FIG. 9 is a block diagram depicting an example of a functional configuration of the image processing apparatus according to this example. Each function of the image processing apparatus according to this example will now be described. A function the same as Example 1 is denoted with a same reference symbol, for which description is omitted.

A frame count value generation unit 1104 is a counter which is incremented by 1 for each frame. In this example, the frame count value generation unit 1104 repeatedly counts from 1 to 3, and outputs a frame count value signal 114 that indicates a count value (frame count value).

A histogram acquisition area decision unit 1103 receives the frame count value signal 114 and determines an acquisition area according to the frame count value. Then the histogram acquisition area decision unit 1103 outputs a coordinate value signal 113 that indicates the determined acquisition area.

Figure 10:
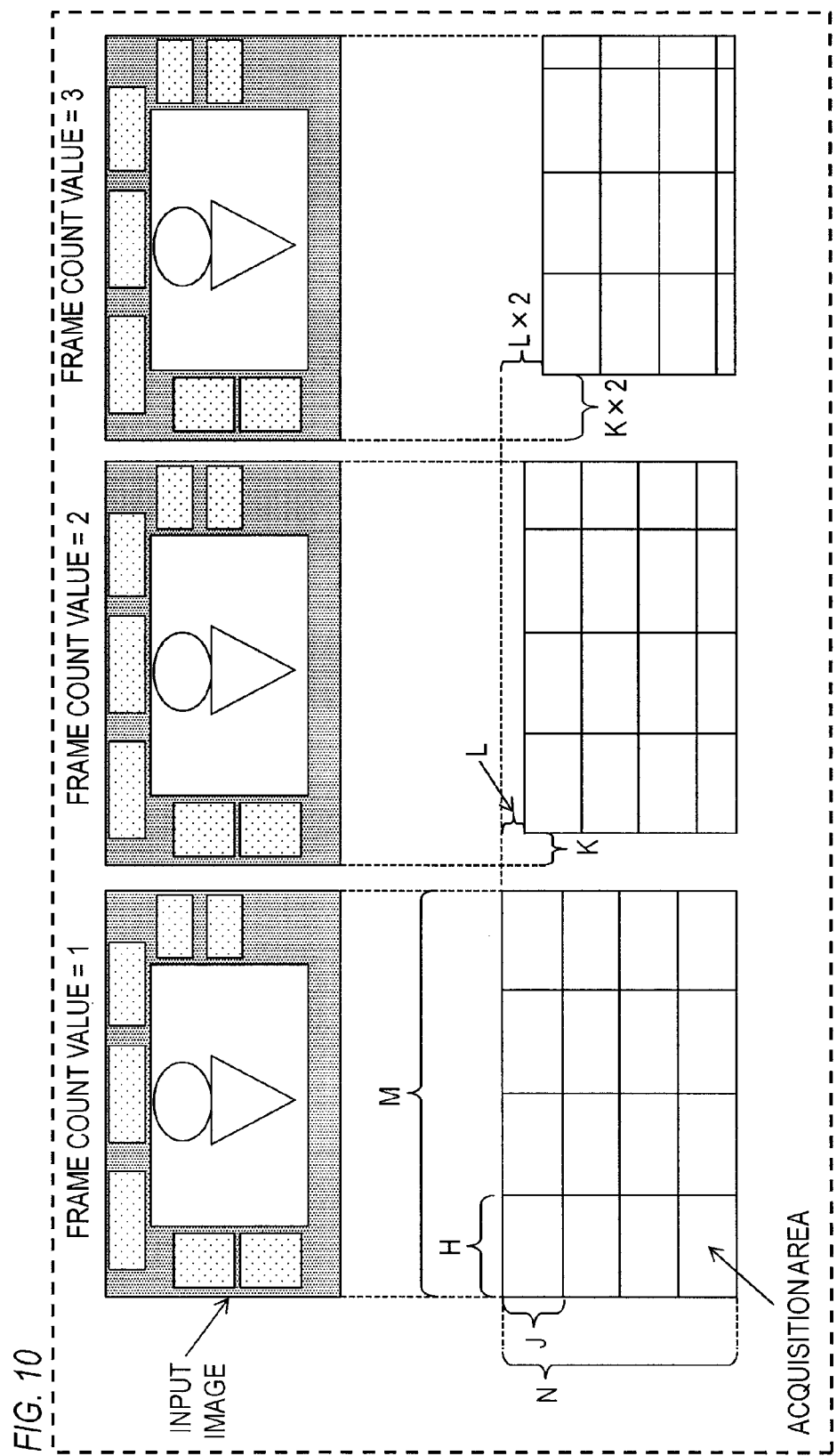
FIG. 10 shows an example of an acquisition area according to Example 2.

In concrete terms, if the frame count value is 1, each of a plurality of segment areas acquired by segmenting an area of the input image is set as an acquisition area, as shown at the left in FIG. 10. To simplify explanation, the size of the segment area is assumed to be the same as Example 1 (H pixels in the horizontal direction×J pixels in the vertical direction). A number of segment areas is also assumed to be the same as Example 1 (M in the horizontal direction×N in the vertical direction).

If the frame count value is 2 as shown at the center in FIG. 10, each of a plurality of areas, which is acquired by diagonally moving the plurality of segment areas, is set as an acquisition area. In concrete terms, each of a plurality of areas acquired by moving the plurality of segment areas by K pixels in the horizontal direction (to the right) and by L pixels in the vertical direction (downward) is set as an acquisition area respectively.

If the frame count value is 3 as shown at the right in FIG. 10, each of a plurality of areas, which is acquired by diagonally moving the plurality of segment areas, is set as an acquisition area respectively. In concrete terms, each of a plurality of areas acquired by moving the plurality of segments areas by K×2 pixels in the horizontal direction (to the right) and by L×2 pixels in the vertical direction (downward) is set as an acquisition area respectively.

A monochrome/color area detection unit 1106 receives a monochrome ratio signal 115 and a frame count value signal 114. Then the monochrome/color area detection unit 1106 detects a monochrome area using a plurality of monochrome ratios for a plurality of segment areas and a plurality of areas determined by diagonally moving the plurality of segment areas (segments the input image into monochrome areas and color areas).

If an input image has a color background, the monochrome/color area detection unit 1106 detects and determines monochrome areas. In concrete terms, the monochrome ratio calculation unit 105 determines that the input image has a color background if a predetermined number (e.g. 7) or more, out of the twelve outermost segment areas, are color areas based on the monochrome ratio 603 of each segment area which was calculated when the frame count value is 1. The monochrome/color area detection unit 1106 transfers the determination result to the monochrome/color area detection unit 1106, where monochrome areas are detected and determined. On the other hand, if less than a predetermined number (e.g. 7) of areas, out of the outermost 12 segment areas, are color areas (e.g. 6 or more monochrome areas) based on the monochrome ratio 603 of each segment area which was calculated when the frame count value 1, the monochrome ratio calculation unit 105 determines that the input image has a monochrome background. The monochrome ratio calculation unit 105 transfers the determination result to the monochrome/color area detection unit 1106, where the color areas are detected and determined.

In this example, a case when the monochrome/color area detection unit 1106 detects and determines monochrome areas for an input image having a color background will be described in detail. A detailed description on the processing for an input image having a monochrome background will be omitted since the same concept as below can be applied.

In concrete terms, first the monochrome/color area detection unit 1106 acquires a monochrome ratio 1302 which was calculated when the frame count value is 1, as shown in FIG. 11. In FIG. 11, a numeric value written in each acquisition area indicates a monochrome ratio of this acquisition area. Then the monochrome/color area detection unit 1106 buffers the acquired monochrome ratio 1302 as a monochrome ratio (buffer monochrome ratio 1305) for each area constituted by K pixels in the horizontal direction×L pixels in the vertical direction (buffering area). In FIG. 11, a numeric value written in each buffering area indicates a buffer monochrome ratio of this buffering area.

Here the buffer monochrome ratio 1305 is determined using the following Expression 9. The buffer monochrome ratio 1305 (i, j) is a buffer monochrome ratio of the buffering area located in the (i+1)th from the left in the horizontal direction, and in the (j+1)th from the top in the vertical direction. The monochrome ratio 1302 (i/3, j/3) is a monochrome ratio of an acquisition area located in the (i/3+1)th from the left in the horizontal direction (decimals of i/3 are rounded down), and in the (j/3+1)th from the top in the vertical direction (decimals of j/3 are rounded down).

Buffer monochrome ratio 1305(*i,j*)=monochrome ratio 1302(*i*/3,*j*/3),where *i*=an integer in a range of 0 to *M*×3−1,and *j*=an integer in a range of 1 to *N*×3−1  (Expression 9)

Then the monochrome/color area detection unit 1106 acquires a monochrome ratio 1303 which was calculated when the frame count value is 2. Then the monochrome/color area detection unit 1106 buffers the acquired monochrome ratio 1303 as a monochrome ratio (buffer monochrome ratio 1306) for each buffering area.

Here for buffering, processing to update the already buffered buffer monochrome ratio 1305 (i, j) is performed. In concrete terms, a higher value, out of the monochrome ratio 1303 ((i−1)/3, (j−1)/3) and the buffer monochrome ratio 1305 (i, j), is regarded as the buffer monochrome ratio 1306 (i, j), as shown in Expression 10. For the buffer monochrome ratio 1306 (0, j) and the buffer monochrome ratio 1306 (i, 0), the values of the buffer monochrome ratio 1305 (0, j) and the buffer monochrome ratio 1305 (i, 0) are used.

Buffer monochrome ratio 1306(*i,j*)=MAX (monochrome ratio 1303((*i*−1)/3,(*j*−1)/3),buffer monochrome ratio 1305(*i, j*)),where *i*=an integer in a range of 1 to *M*×3−1,and *j*=an integer in a range of 1 to *N*×3−1  (Expression 10)

Then the monochrome/color area detection unit 1106 acquires a monochrome ratio 1304 which was calculated when the frame count value is 3. Then the monochrome/color area detection unit 1106 buffers the acquired monochrome ratio 1304 as a monochrome ratio (buffer monochrome ratio 1307) for each buffering area.

Here for buffering, processing to update the already buffered buffer monochrome ratio 1306 (i, j) is performed. In concrete terms, a higher value, out of the monochrome ratio 1304 ((i−2)/3, (j−2)/3) and the buffer monochrome ratio 1306 (i, j), is regarded as the buffer monochrome ratio 1307 (i, j), as shown in Expression 11. For the buffer monochrome ratio 1307 (0, j), the buffer monochrome ratio 1307 (i, 0), the buffer monochrome ratio 1307 (1, j) and the buffer monochrome ratio 1307 (i, 1), the values of the buffer monochrome ratio 1306 (0, j), buffer monochrome ratio 1306 (i, 0), buffer monochrome ratio 1306 (1, j) and buffer monochrome ratio 1306 (i, 1) are used.

Buffer monochrome ratio 1307 (*i, j*)=MAX (monochrome ratio 1304 ((*i*−2)/3, (*j* −2)/3), buffer monochrome ratio 1306 (*i, j*)), where *i*=an integer in a range of 2 to M×3−1, and *j*=an integer in a range of 2 to N×3−1  (Expression 11)

Then the monochrome/color area detection unit 1106 detects a monochrome area based on the buffer monochrome ratio 1307. In concrete terms, an area of which the buffer monochrome ratio 1307 is a predetermined threshold or more is detected as a monochrome area (the other area is determined as a color area). In this example, the predetermined threshold is set to 95.

Figure 12:
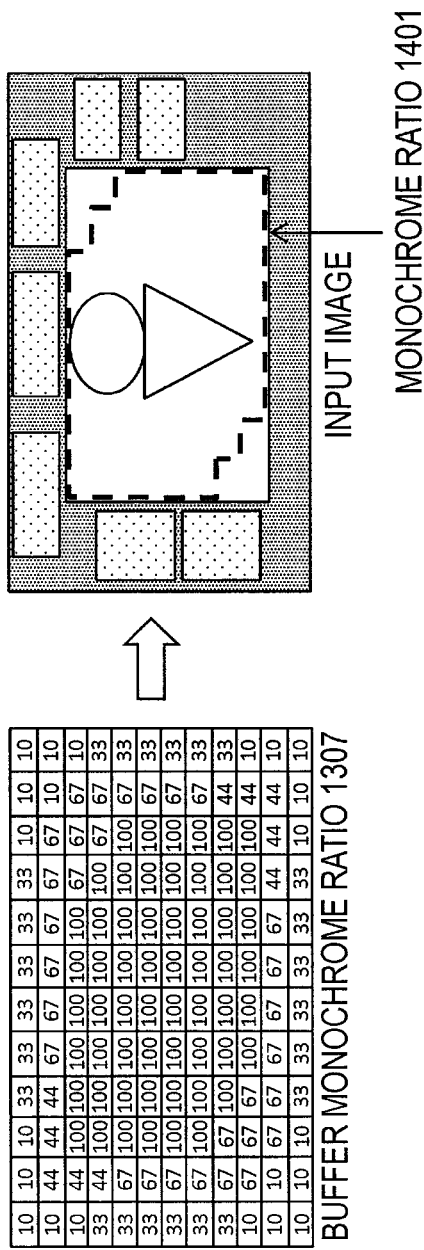
FIG. 12 shows an example of a monochrome area detected by the image processing apparatus according to Example 2.

As a result, as FIG. 12 shows, the monochrome area 1401 is detected.

The monochrome/color area detection unit 1106 outputs a signal that indicates a monochrome area as a monochrome area signal 118.

By this processing, a monochrome area can be detected more accurately than prior art. In concrete terms, a pixel group constituted by K pixels in the horizontal direction×L pixels in the vertical direction is a target of determining whether this area is a monochrome area or not, and the determination is performed based on a plurality of monochrome ratios for a plurality of acquisition areas including the determination target pixel group. As a result, the determination can be performed more accurately than determination based on one histogram (one monochrome ratio).

A monochrome area and a color area are mostly rectangular. In this example, the determination is performed for each unit of K pixels in the horizontal direction×L pixels in the vertical direction, hence the boundary of a monochrome image and a color image can be more accurately detected than performing the determination for each unit of a segment area (H pixels in the horizontal direction×J pixels in the vertical direction).

Furthermore in this example, the determination is performed based on the highest monochrome ratio, out of a plurality of monochrome ratios in a plurality of acquisition areas including the target pixel group, for which it is determined whether this pixel group is a monochrome area or not. Therefore a pixel group including pixels of a color area and pixels of a monochrome area can be easily determined as a monochrome area, and omission of a monochrome area due to a detection error can be decreased.

Furthermore in this example, a total number of acquisition areas to be set can be decreased compared with Example 1, since areas generated by diagonally moving the plurality of segment areas are used as the plurality of acquisition areas. As a result, the processing time and processing load can be decreased more than Example 1.

As described above, according to this example, a similar effect to Example 1 can be implemented in a shorter time than Example 1 and with less processing than Example 1.

Example 3

An image processing apparatus and a method for controlling the image processing apparatus according to Example 3 of the present invention will now be described. In this example, the image processing apparatus executes the image processing in rectangular area units. Example 3 can be performed in combination with Example 1 or Example 2. Details on the combining method will be described at the end of this example.

Figure 13:
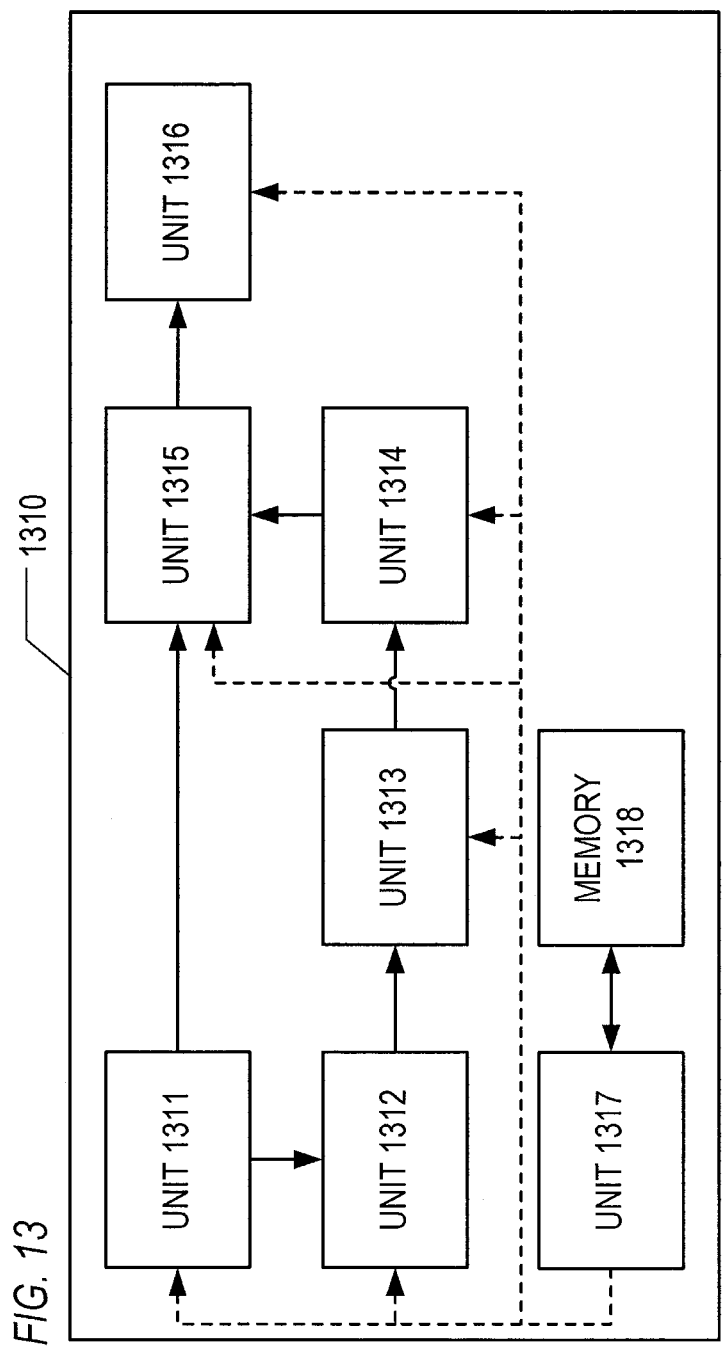
FIG. 13 is a block diagram depicting an example of a functional configuration of an image processing apparatus according to Example 3.

FIG. 13 is a block diagram depicting an example of a functional configuration of the image processing apparatus according to this example.

As FIG. 13 shows, the image processing apparatus 1310 according to this example includes an input unit 1311, a histogram acquisition unit 1312, a segment area determination unit 1313, a rectangular area setting unit 1314, a γ correction unit 1315, an output unit 1316, a control unit 1317 and a memory 1318.

The control unit 1317 is a central processing unit (CPU; computer), for example. The control unit 1317 accesses the memory 1318 when necessary, and controls each functional unit of the image processing apparatus 1310.

The memory 1318 is a storage device, such as a magnetic disk and a semiconductor memory. The memory 1318 stores programs executed by the control unit 1317 and the parameters to be used for controlling each functional unit.

The input unit 1311 inputs image data (data of an input image: input image data) from the outside to the image processing apparatus 1310. The input unit 1311 is constituted by a terminal conforming to such communication standards as digital visual interface (DVI), high-definition multimedia interface (HDMI), universal serial bus (USB) or local area network (LAN), and a processing circuit thereof.

The input unit 1311 transmits input image data to the histogram acquisition unit 1312 and the γ correction unit 1315.

In this example, it is assumed that the input image data is YCbCr type image data. Pixel values of YCbCr type image data are constituted by a Y value, a Cb value and a Cr value, where the Y value is a brightness signal, and the Cb value and the Cr value are color difference signals. The input image data, however, is not limited to this data. The input image data can be RGB type image data.

The input unit 1311 may be a functional unit that reads image data from such a storage device as a magnetic disk and a semiconductor memory, and outputs the data to the histogram acquisition unit 1312 and the γ correction unit 1315. The storage device may be a part of the image processing apparatus or may be a device separate from the image processing apparatus.

The histogram acquisition unit 1312 acquires a histogram of a pixel value of each segment area (rectangular segment area), which is acquired by segmenting an area of an input image in a matrix. In concrete terms, the histogram acquisition area 1312 generates a color histogram and a brightness histogram for each segment area. The color histogram is a histogram that indicates a frequency for each color, and is, for example, a histogram to indicate frequency for each combination of a Cb value and a Cr value. The brightness histogram is a histogram to indicate a frequency for each brightness, and is, for example, a histogram that indicates a frequency for each Y value.

In this example, two histograms are generated, but the histograms to be generated are not limited to this. For example, a three-dimensional histogram of which axes are the Y value, Cb value and Cr value may be generated.

Further, in this example, the histogram acquisition unit 1312 generates a histogram based on the input image data, but a histogram may be inputted (acquired) from the outside.

The segment area determination unit 1313 determines, for each segment area, whether this segment area is a monochrome area, a color area or a black area, based on a histogram acquired by the histogram acquisition unit 1312.

Based on the determination result of the segment area determination unit 1313, the rectangular area setting unit 1314 combines one or a plurality of same type segment areas, and sets a target rectangular area to receive image processing. Here "type" refers to a "monochrome area", a "color area" and a "black area". In this example, a segment area determined as a black area is regarded as a monochrome area on a color area depending on the type of adjacent segment area. Thereby rectangular-shaped monochrome areas (monochrome rectangular area) and rectangular-shaped color areas (color rectangular areas) are set respectively, so that a number of target rectangular areas to receive image processing is decreased. The monochrome rectangular area is a rectangular area to which later mentioned first image processing for monochrome areas is applied. The color rectangular area is a rectangular area to which later mentioned second image processing for color areas is applied.

The γ correction unit 1315 is an image processing unit that can execute the first image processing and the second image processing. The γ correction unit 1315 executes the image processing for each rectangular area, which is set by the rectangular area setting unit 1314. In concrete terms, the γ correction unit 1315 performs the first image processing for a monochrome rectangular area which is set by the rectangular area setting unit 1314, and performs the second image processing for a color rectangular area which is set by the rectangular area setting unit 1314. In this example, the first image processing is the DICOM γ correction, and the second image processing is the 2.2 γ correction. The image processing, however, is not limited to such image processing. For example, the first image processing and the second image processing may be brightness adjustment processing for a monochrome area and brightness adjustment processing for a color area. The first image processing and the second image processing may be color temperature adjustment processing for a monochrome area and color temperature adjustment processing for a color area.

The output unit 1316 outputs the input image data generated after the image processing (γ correction) as the output image data. The output image data is inputted to such an image display device as a liquid crystal display device, where an image based on the output image data is displayed. The image display device may be a part of the image processing apparatus 1310, or may be a device that is separate from the image processing apparatus 1310.

Figure 14:
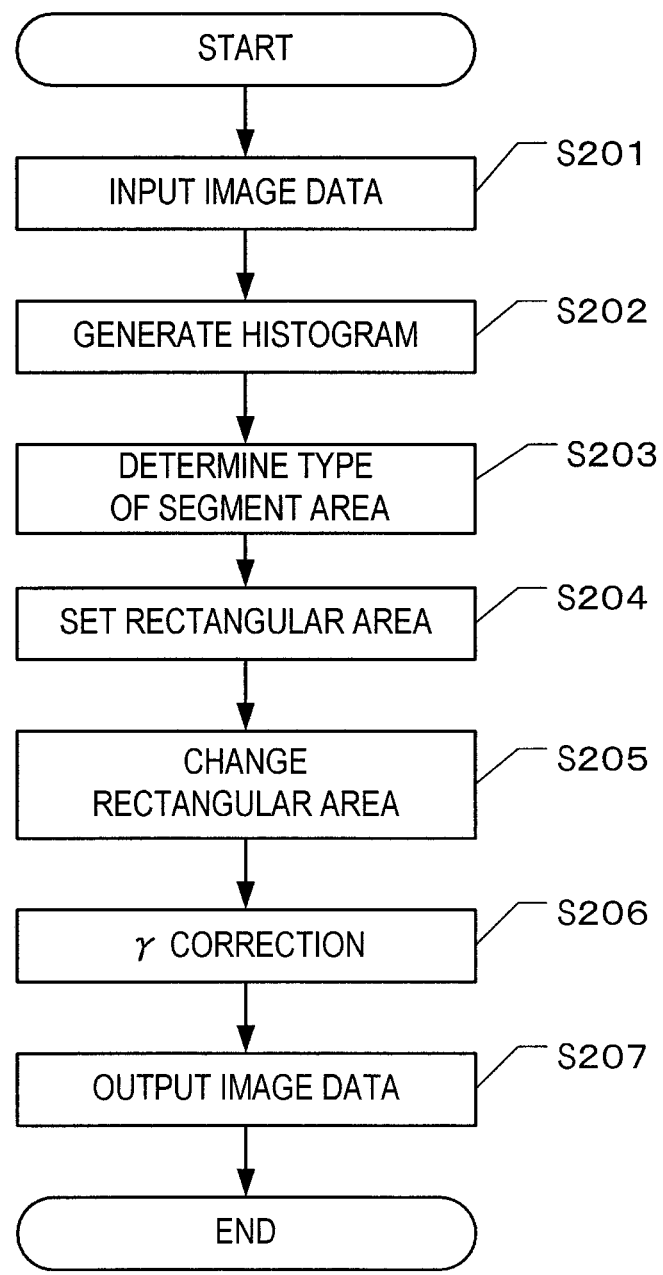
FIG. 14 is a flow chart depicting an example of a processing flow of the image processing apparatus according to Example 3.

FIG. 14 is a flow chart depicting an example of a processing flow of the image processing apparatus 1310 according to this example.

First in step S201, the input unit 1311 inputs input image data.

Figure 15A:
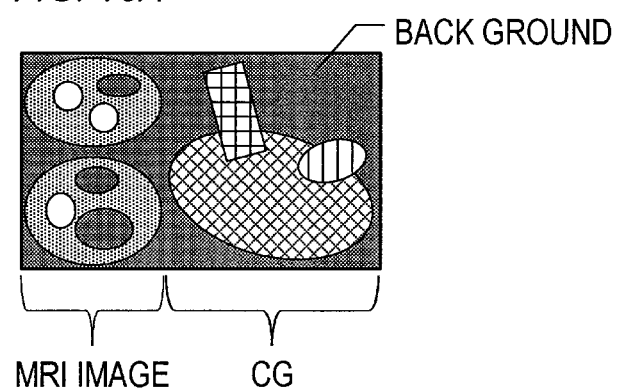
FIG. 15A and FIG. 15B show an example of an input image and a segment area.

FIG. 15A shows an example of an input image.

FIG. 15A is an example where cross-sectional views (magnetic resonance imaging (MRI) images) generated by MRI are arranged as monochrome images at the left, and a computer graphics (CG) modeling the MRI images are arranged at the right of the input image as color images.

In this example, the case of inputting the data of the input image shown in FIG. 15A will be described.

In FIG. 15A, it is assumed that the background of the MRI images and the background of the CG images are both black (Y=Cb=Cr=0). The size of the input image is 1920 pixels in the horizontal direction×1200 pixels in the vertical direction. The input image data is assumed to be 8-bit data.

Then in step S202, the histogram acquisition unit 1312 segments the input image data into data for each segment area.

Figure 15B:
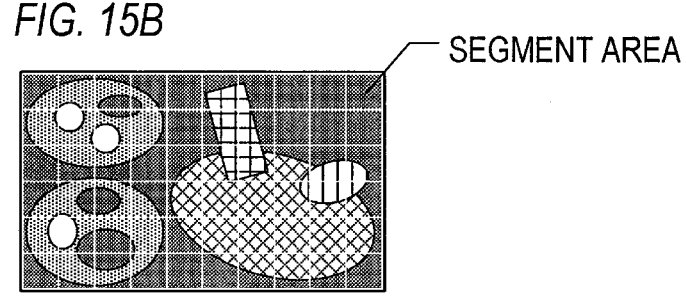

FIG. 15B is an example of segmenting the input image. In this example, as FIG. 15B shows, the input image is segmented into a total of 60 segment areas, that is, 10 areas in the horizontal direction×6 areas in the vertical direction. In this case, the size of a segment area is 192 pixels (=1920/10) in the horizontal direction×200 pixels (=1200/6) in the vertical direction.

Then the histogram acquisition unit 1312 generates a brightness histogram and a color histogram for each segment area.

In this example, for the brightness histogram, a histogram that indicates the frequency of each category with an 8-gradation width, which is acquired by segmenting a possible range of the Y value (0 to 255), is generated. The brightness histogram for one segment area is generated, for each category, by counting a number of pixels belonging to the category in this segment area.

In this example, for the color histogram, a histogram that indicates the frequency of each category with an 8-gradation width, which is acquired by segmenting possible ranges of the Cb value and the Cr value (0 to 255), is generated. The color histogram for one segment area is generated, for each category, by counting a number of pixels belonging to the category in this segment area.

The width of the category is not limited to 8 gradations. For example, the width of the category may be 4 gradations or 16 gradations. The width of the category may be different between the brightness histogram and the color histogram. The width of the category may be different between the Cb value and the Cr value.

Then in step-S203, the segment area determination unit 1313 determines a type of each segment area based on the histogram acquired in step S202.

FIG. 16 shows an example of the determination method. In this example, a type of each segment area is determined as follows.

Monochrome area: A segment area where the ratio of frequency of a pixel of which Cb value is 0 to 7 and Cr value is 0 to 7, with respect to the total frequency of the color histogram is 95% or more, and the ratio of frequency of a pixel of which Y value is not 0 to 7, with respect to the total frequency of the brightness histogram is 95% or more.

Black area: A segment area where the ratio of frequency of a pixel of which Cb value is 0 to 7 and Cr value is 0 to 7, with respect to the total frequency of the color histogram is 95% or more, and the ratio of frequency of a pixel of which Y value is 0 to 7, with respect to the total frequency of the brightness histogram is 95% or more.

Color area: A segment area other than the above mentioned segment areas.

In some cases a monochrome image may include color pixels of a color comment for example, and the area of the monochrome image must be determined as a monochrome area even if some color pixels exist. Therefore according to this example, the threshold to be used for determining whether an area is a monochrome area or not is set not to 100% but to 95%.

It is difficult to determine whether a segment area, which includes black pixels and some color pixels of a color image or the above mentioned color comment, is a monochrome area or a color area. Therefore according to this example, such an area is determined as a black area using a threshold that is not 100% but 95%.

Figure 17A:
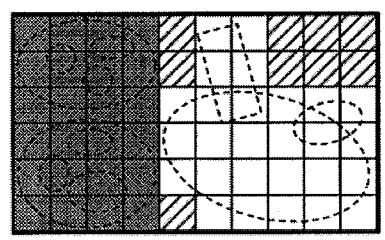
FIG. 17A and FIG. 17B show an example of the processing result of steps S203 and S204 in FIG. 14.

FIG. 17A shows an example of the determined result in step S203.

In the example in FIG. 17A, the segment areas that include only the MRI images are determined as a monochrome area. Out of the segment areas that include only CG, segment areas that include color panels are determined as a color area, and segment areas that do not include color pixels (segment areas that include only background) are determined as a black area.

The method for determining whether an area is a monochrome area, a color area or a black are is not limited to the above mentioned method. Any determination method can be used as long as determination is based on a histogram. For example, if the histogram is a histogram of which width of one category is 1 gradation and is a three-dimensional histogram of which axes are the Y value, the Cb value and the Cr value, then the type of each segment area may be determined as follows.

Monochrome area: A segment area where the ratio of frequency of pixels in which Cb value=Cr value=0 and Y value≠0, with respect to the total frequency of the histogram, is 95% or more.

Black area: A segment area where the ratio of frequency of pixels in which Cb value=Cr value=Y value=0, with respect to the total frequency of the histogram, is 95% or more.

Color area: A segment area other than the above mentioned segment areas.

In the above example, a black pixel is a pixel where Cb value=Cr value=Y value=0, and is a segment area where the ratio of the black pixels is a predetermined value or more is regarded as a black area, but a predetermined threshold may be set so that an area of which brightness or chroma are not higher than the predetermined value is regarded as a black area. For example, a pixel of which Cb value, Cr value and Y value are predetermined thresholds or less may be regarded as a black pixel.

Then in step S204, the rectangular area setting unit 1314 sets a rectangular area constituted by one or a plurality of same type segment areas based on the determination result in step S203. Since a type of the area is determined for each segment area in step S203, the area constituted by a plurality of same type segment areas may be a non-rectangular area, as in the case of the area constituted by segment areas determined as a color area in FIG. 17A. In this step, such an area is segmented into a plurality of rectangular areas. Further, in this step a rectangular area constituted by a plurality of same type segment areas is set so that a number of rectangular areas is decreased.

In this example, it is assumed that one of same type segment areas continuously arranged in the horizontal direction is selected with priority as a segment area in one rectangular area. In concrete terms, after a combined area constituted by the same type segment areas continuously arranged in the horizontal direction is set, an area constituted by same type combined areas, which are continuously arranged in the vertical direction and have a same position and length in the horizontal direction, is set as a rectangular area. The method for setting a rectangular area in this step is not limited to this. For example, same type segment areas continuously arranged in the vertical direction may be selected as segment areas in one rectangular area.

Figure 17B:
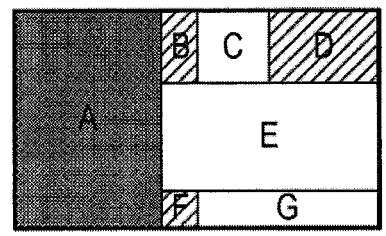

If the detection result shown in FIG. 17A is acquired in step S203, the rectangular areas shown in FIG. 17B are set in this step. In FIG. 17B, areas C, E and G are rectangular areas (color rectangular areas) constituted by segment areas determined as color areas. Area A is a rectangular area (monochrome rectangular area) constituted by segment areas determined as monochrome areas. Areas B, D and F are rectangular areas (black rectangular areas) constituted by segment areas determined as black areas.

In step S205, the rectangular area setting unit 1314 detects four segment areas, in two rows by two columns, where a part of the segment areas is a black area and the rest of the segment areas is a monochrome area or a color area. Based on the arrangement of a monochrome area, a color area and a black area in the four segment areas, the rectangular area setting unit 1314 regards the black area out of the four segment areas as a monochrome area or a color area, and updates the rectangular areas which were set in step S204. Details on the process in this step will be described later.

Then in step S206, the γ correction unit 1315 performs image processing (γ correction) on each of the rectangular areas which were set in step S205. In concrete terms, the γ correction unit 1315 performs DICOM γ correction on a monochrome rectangular area and 2.2 γ correction on a color rectangular area.

In step S207, the output unit 1316 outputs, as the output image data, the input image data on which the γ correction was performed in step S206.

Now details on the processing in step S205 in FIG. 14 will be described with reference to FIG. 18.

First in step S800 the rectangular area setting unit 1314 determines whether a number of rectangular areas which are currently set is greater than a predetermined value. If a number of rectangular areas which are currently set is greater than the predetermined value, processing advances to step S801, and if a number of rectangular areas which are current set is the predetermined value or less, this flow ends (processing advances to step S206).

If the rectangular areas are set as shown in FIG. 17B, a number of rectangular areas is 7. In this example, the predetermined value is set to 2. The predetermined value is an upper limit value of a number of times of the image processing that can be executed for one frame, for example.

In step S801, the rectangular area setting unit 1314 selects one vertex (internal vertex) which is not positioned at the edge of the input image, out of the vertexes of the rectangular areas which are currently set. According to this example, if a plurality of internal vertexes exist, processing to sequentially scan the input image from left to right is performed in the sequence from top to bottom of the input image, and an internal vertex that is detected first is selected. In other words, if a plurality of internal vertexes exist, an internal vertex that is located at the highest position is selected with priority, and if a plurality of internal vertexes of which vertical positions are the same exist, an internal vertex that is located at the very left is selected out of the plurality of internal vertexes. For example, if the rectangular areas are set as shown in FIG. 17B, the lower left vertex of area B is selected.

Then in step S802, the rectangular area setting unit 1314 determines whether an area constituted by four segment areas in two rows by two columns centering around the internal vertex selected in step S801 is a concave area or not (concave area determination).

In this step, an area constituted by the four segment areas is determined as a concave area in the following two cases, and is determined as a non-concave area otherwise.

(1) The types of three segment areas, out of the four segment areas, are the same.

(2) The types of the two adjacent segment areas, out of the four segment areas, are the same, and a type of each one of the other segment areas is different from the other segment areas.

For example, if the lower left vertex of area B in FIG. 17B is selected in step S801, this falls under the above (2), hence it is determined that the area constituted by the four segment areas in the two rows by two columns centering around the inner vertex selected in step S801 is a concave area.

If it is determined that the area is a concave area in step S802, processing advances to step S804, and if it is determined that the area is not a concave area in step S802, on the other hand, processing advances to step S806 (step S803).

In step S804, the rectangular area setting unit 1314 determines a concave pattern of the concave area determined (detected) in step S802 (concave pattern determination). The "concave pattern" is an arrangement of a segment area determined as a monochrome area, a segment area determined as a color area, and a segment area determined as a black area in the concave area.

Then in step S805, the rectangular area setting unit 1314 regards the segment area determined as a black area, located in the concave area determined (detected) in step S802, as a monochrome area or a color area depending on the determination result in step S804 (assumption processing). Then the rectangular area setting unit 1314 changes the rectangular areas which are currently set (rectangular area change processing).

The processing advances to step S806.

Figure 19:
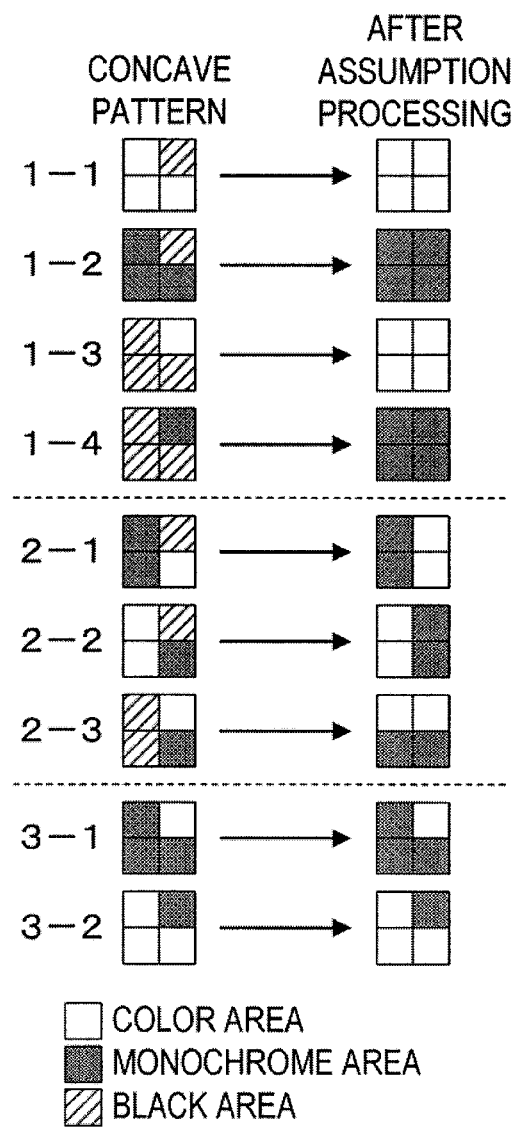
FIG. 19 shows an example of a concave pattern and a processing result of assumption processing according to Example 3.

The concave pattern has the following three patterns as shown in FIG. 19.

(1) One or three segment areas is black area, and the rest of the segment areas is a color area (1-1 and 1-3 in FIG. 19), or one or three segment areas is/are a black area and the rest of the segment areas is a monochrome area (1-2 and 1-4 in FIG. 19).

(2) Three types of segment areas exist, and the types of two adjacent segment areas are the same (2-1 to 2-3 in FIG. 19).

(3) One or three segment areas is/are a monochrome area, and the rest of the segment areas is a color area (3-1 and 3-2 in FIG. 19).

In step S805, as FIG. 19 shows, the black segment area, out of the four segment areas constituting the concave area, is regarded as a monochrome area or a color area, so that the concave area determined (detected) in step S802 is no longer a concave area.

In concrete terms, if a concave pattern is the pattern in (1), the black segment area is regarded as a color area or a monochrome area, so that all the segment areas constituting the concave area becomes color areas or monochrome areas.

If the concave pattern is the pattern in (2), the black segment area is regarded as a color area or a monochrome area, so that the boundary of the color area and the monochrome area constituting the concave area becomes a straight line.

If the concave pattern is the pattern in (3), no assumption processing is performed, since there is no black segment area in the concave area.

In this example, when a segment area in one black rectangular area is regarded as a monochrome area or a color area, all the segment areas in this black rectangular area are also regarded as a monochrome area or a color area. In other words, in this example, a black area is regarded as a monochrome area or a color area as a unit of a black rectangular area. For example, if the lower left vertex of area B in FIG. 17B is selected in step S801, it is determined that the concave pattern is the pattern of 2-1 in FIG. 19, and the entire area B is regarded as a color area. The processing to regard a black area as a monochrome area or a color area may be performed as a unit of a segment area. For example, if the lower left vertex of area B in FIG. 17B is selected in step S801, only the bottom segment area in area B may be regarded as a color area. In the case of such a configuration, the top segment area in area B is regarded as a color area in the processing to be described next.

In step S802, the case that falls under the pattern in (3) need not be determined as a concave area.

In step S806, the rectangular area setting unit 1314 determines whether all the segment areas (all the black rectangular areas) determined as a black area have been regarded as a color area or a monochrome area. If all the black rectangular areas have been regarded as a color area or a monochrome area, this processing flow ends (processing advances to step S206). If there is a black rectangular area which is not regarded as a color area or a monochrome area, processing returns to step S800.

When this processing flow ends, the rectangular area setting unit 1314 transmits the area information that indicates the currently set rectangular ares (area information that indicates the rectangular areas after update if the rectangular areas have been updated in this flow) to the γ correction unit 1315.

Figure 18:
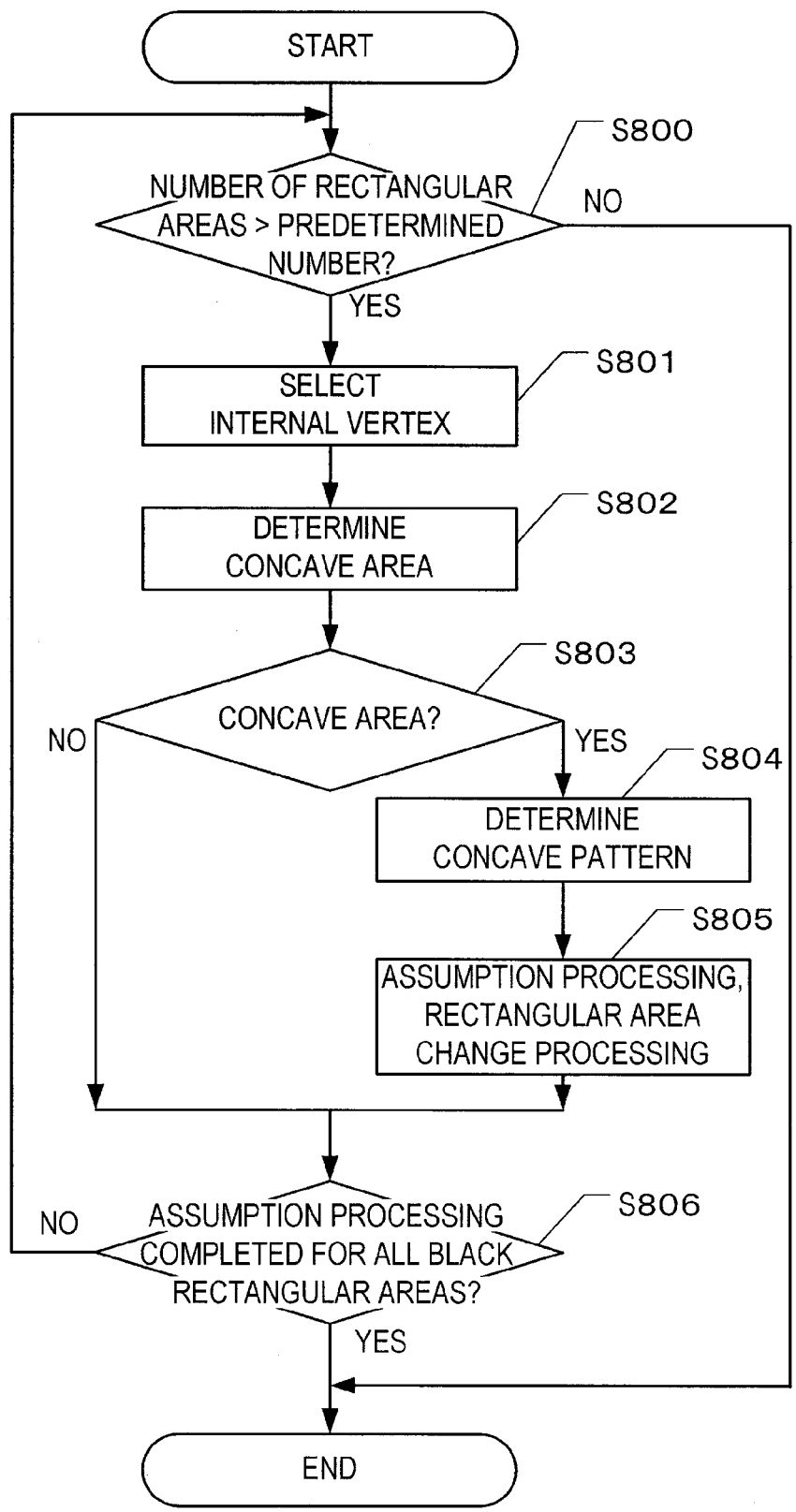
FIG. 18 is a flow chart depicting a detail of the processing in step S205 in FIG. 14.
Figure 20A:
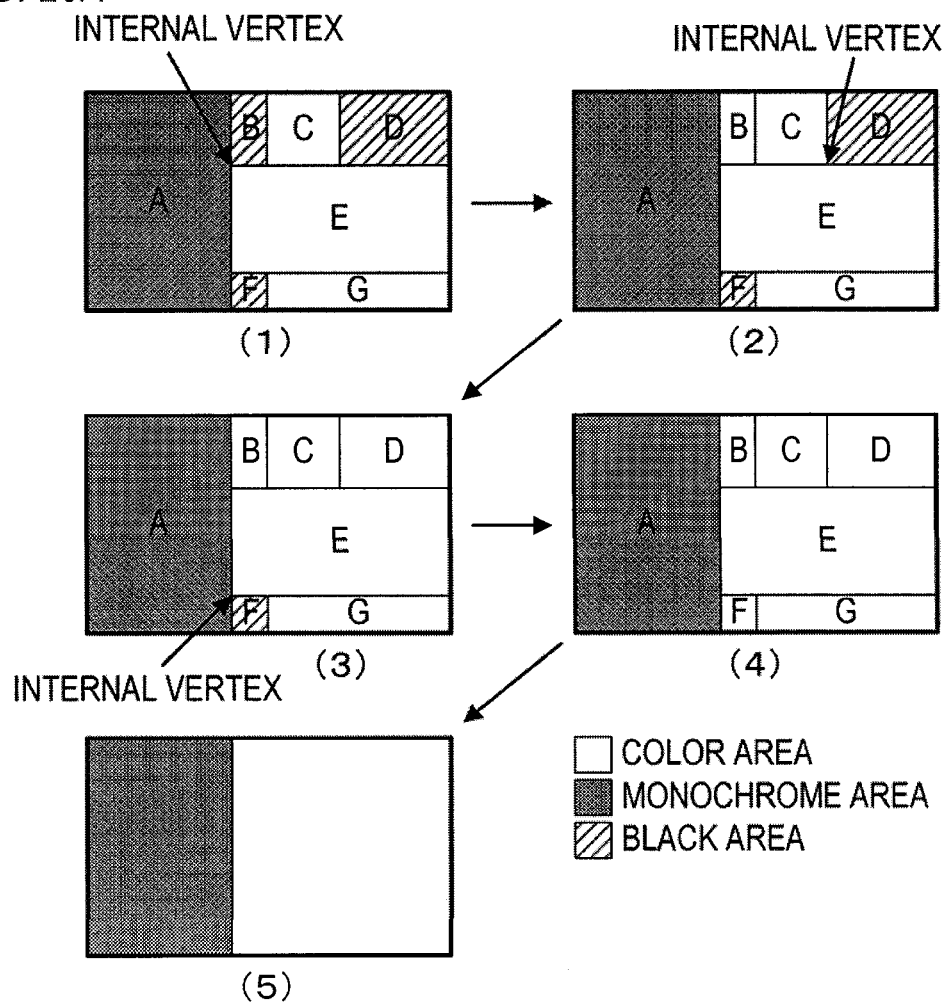
FIG. 20A and FIG. 20B show an example of processing of the image processing apparatus according to Example 3 and Example 5.

For example, if rectangular areas are set as shown in FIG. 17B, the rectangular areas are updated as shown in FIG. 20A by performing the processing in FIG. 18.

First as shown in (1) of FIG. 20A, an area constituted by segment areas in two rows by two columns centering around the lower left vertex of area B is detected as a concave area. The concave pattern of the detected concave area falls under the pattern of 2-1 in FIG. 19, area B, which is a black rectangular area, is regarded as a color area, and a type of each rectangular area becomes the state shown in (2) of FIG. 20A. In this state, if a monochrome rectangular area, a color rectangular area and a black rectangular area are set so as to minimize a number of rectangular areas, then areas B and C become one rectangular area, and the total number of rectangular areas becomes six. In the case of the state in (1) of FIG. 20A, the total number of rectangular areas is seven, which means that the total number of rectangular areas decreases by 1 by regarding area B as a color area.

Then as (2) of FIG. 20A shows, an area constituted by segment areas in two rows by two columns centering around the lower left vertex of area D is detected as a concave area. Since the concave pattern of the detected concave area falls under the pattern of 1-1 in FIG. 19, area D, which is a black rectangular area, is regarded as a color area, and a type of each rectangular area becomes the state shown in (3) of FIG. 20A. In this state, if a monochrome rectangular area, a color rectangular area and a black rectangular area are set so as to minimize a number of rectangular areas, then areas B, C, D and E become one rectangular area, and the total number of rectangular area become four. If the threshold (predetermined value) in step 800 is four, then four rectangular areas, that is area A, the area constituted by areas B, C, D and E, area F and area G are set, and the processing flow in FIG. 18 ends. In this case, either one of the first image processing and the second processing can be performed on area F, which is a black rectangular area. For example, the rectangular area setting unit 1314 may perform processing (assumption processing) to regard the black rectangular area as a monochrome rectangular area, and the first image processing may be performed on the black rectangular area. The assumption processing may also be processing to regard the black rectangular area as a color rectangular area. Since the black rectangular area is a black (or low brightness, low chroma) area, the area does not look very different whether the first image processing or the second image processing is performed. If it is predetermined in the γ correction unit 1315 which one of the first image processing and the second image processing is performed, then the above mentioned assumption processing (processing to regard a black rectangular area as a monochrome rectangular area or a color are) need not be performed.

Then as (3) of FIG. 20A shows, the area constituted by segment areas in two rows by two columns centering around the upper left vertex of area F is detected as a concave area. Since the concave pattern of the detected concave area falls under the pattern of 2-1 in FIG. 19, area F, which is a black rectangular area, is regarded as a color area, and a type of each rectangular are becomes the state shown in (4) of FIG. 20A.

Finally as (5) of FIG. 20A shows, two rectangular areas are seta. In concrete terms, area A is set as a monochrome rectangular area, and the area constituted by areas B, C, D, E, F and G is set as a color rectangular area.

As described above, according to this example, it is determined, for each segment area, whether this segment area is a monochrome area, a color area or a black area. A segment area determined as a black area is regarded as a monochrome area or a color area, so as to decrease a number of rectangular areas to be the targets of the image processing. Thereby in the image processing apparatus that executes image processing for each rectangular area, the processing load required for performing image processing independently for a monochrome area and a color area can be decreased without dropping the accuracy to detect a monochrome area and a color area. In concrete terms, the drop in accuracy to detect a monochrome area and a color area can be suppressed since the size of a segment area need not be increased more than the prior art. Furthermore the processing load in the image processing can be decreased compared with the prior art, since a number of rectangular areas to be the targets of the image processing can be decreased compared with the prior art.

Furthermore, according to this example, a black segment area is regarded as a monochrome area or a color area based on a concave pattern. Thereby a black segment area can be accurately regarded as a monochrome area or a color area. In concrete terms, if a black segment area is an area in a color image, regarding this segment area as a monochrome area in error can be prevented. In the same manner, if a black segment area is an area in a monochrome image, regarding this segment area as a color area in error can be prevented. As a result, image quality interference, such as brightness step difference in a color image or in a monochrome image can be suppressed.

In this example, the image processing is also performed on a black rectangular area, but the image processing need not be performed on a black rectangular area. In this case, it is determined in step S800 in FIG. 18 whether the total number of color rectangular areas and monochrome rectangular areas is greater than a predetermined value. If rectangular areas are set as shown in FIG. 17B, the total number of the color rectangular areas and the monochrome rectangular areas is four.

In this example, the processing to regard a black segment area as a color area or a monochrome area is repeated until a total number of rectangular areas becomes a predetermined value or less, or until all the black segment areas are regarded as a color area or a monochrome area, but [the present invention] is not limited to this configuration. For example, the processing in step S800 in FIG. 18 need not be performed. In this case, all the black segment areas are regarded as color areas or monochrome areas.

To combine Example 3 and Example 1, the segment area determination unit 1313 and the rectangular area setting unit 1314 of Example 3 are disposed in the monochrome area decision unit 108 of Example 1, for example. Then as post-processing of the monochrome area decision processing according to Example 1, the segment area determination processing and the rectangular area setting processing according to Example 3 are executed. To combine Example 3 and Example 2, the segment area determination unit 1313 and the rectangular area setting unit 1314 of Example 3 are disposed in the monochrome/color area decision unit 1106 of Example 2, for example. Then as post-processing of the monochrome area decision processing according to Example 2, the segment area determination processing and the rectangular area setting processing according to Example 3 are executed.

In concrete terms, a black area is detected for each segment area by the segment area determination processing (processing to determine whether the segment area is a monochrome area, a color area or a black area) of Example 3. For a segment area which was not determined as a black area, the determination result of the monochrome area decision processing is used, so that the segment area determined as a black area is regarded as a monochrome area or a color area according to the method of Example 3.

In the case of combining Example 3 and Example 1, or in the case of combining Example 3 and Example 2, the segment area determination processing is performed on a segment area which is a pixel group constituted by H×J pixels or less. In other words, for each pixel group constituted by H×J pixels or less, it is determined whether this pixel group is a monochrome area, a color area or a black area. The pixel group constituted by H×J pixels or less is, for example, a pixel group constituted by K×J pixels, or a pixel group constituted by pixels less than K×J pixels.

Example 4

An image processing apparatus and a method for controlling the image processing apparatus according to Example 4 of the present invention will now be described. Example 4 can be performed in combination with Example 1 or Example 2. Details on the combining method will be described at the end of the description of this example.

In the description below, portions different from Example 3 will be described, and portions the same as Example 3 will be omitted.

According to this example, in step S203 in FIG. 14, the segment area determination unit 1313 determines, for each segment area, whether the segment area is a monochrome area, a color area, a black area or a comment area, which is an area for a comment, based on a histogram acquired in step S202.

FIG. 21 shows an example of the determination method. In this example, a type of each segment area is determined as follows. In this example, it is assumed that a color histogram of which width of the category is 8 gradations and a brightness histogram are acquired in step S202, just like Example 3.

Comment area: A segment area where all the pixels, other than the pixels belonging to a category of Cb value 0 to 7 and Cr value 0 to 7 belong to a same category in the color histogram.

Monochrome area: A segment area where a ratio of frequency of a pixel of which Cb value is 0 to 7 and Cr value is 0 to 7, with respect to the total frequency of the color histogram is 95% or more, and the ratio of frequency of a pixel of which Y value is not 0 to 7, with respect to the total frequency of the brightness histogram is 95% or more.

Black area: A segment area where the ratio of frequency of a pixel of which Cb value is 0 to 7 and Cr value is 0 to 7, with respect to the total frequency of the color histogram is 95% or more, and the ratio of frequency of a pixel of which Y value is 0 to 7, with respect to the total frequency of the brightness histogram is 95% or more.

Color area: A segment area other than the above mentioned segment areas.

At a medical site, a color comment is sometimes written on a monochrome image. A number of colors used for a comment is normally one, so an area, which may be a comment portion on a monochrome image, is recognized as a comment area by the above mentioned method.

The method for determining whether an area is a monochrome area, a color area, a black area or a comment area is not limited to the above mentioned method. Any determination method can be used as long as the determination is based on a histogram. For example, if a histogram is a histogram on which a width of one category is 1 gradation, and is a three-dimensional histogram of which axes are the Y value, the Cb value and the Cr value, then the type of each segment area may be determined as follows.

Comment area: A segment area where all the pixels, other than the pixels belonging to a category of Cb=Cr=0 are a plurality of pixels having a same color (combination of a Cb value and Cr value is the same).

Monochrome area: A segment area where the ratio of frequency of pixels in which Cb value=Cr value=0 and Y value≠0, with respect to the total frequency of the histogram, is 95% or more.

Black area: A segment area where the ratio of frequency of pixels in which Cb value=Cr value=Y value=0, with respect to the total frequency of the histogram, is 95% or more Color area: A segment area other than the above mentioned segment areas.

In the above example, a combination of one type Cb value and a Cr value has one color, but a predetermined threshold may be set so that a plurality of pixels, of which difference of a combination of a Cb value and a Cr value is the predetermined threshold or less, is regarded as same color pixels.

According to this example, in step S205 in FIG. 14, a segment area determined as a black area and a segment area determined as a comment area, by the segment area determination unit 1313, are regarded as a monochrome area or a color area respectively depending on the type of adjacent segment areas. Thereby a monochrome rectangular area and a color rectangular area are set respectively, so as to decrease a number of rectangular areas to be targets of the image processing.

In concrete terms, in step S205 in FIG. 14, the segment area determination unit 1313 performs the following processing, besides the processing described in Example 3.

The segment area determination unit 1313 detects four segment areas in two rows by two columns, where a part of the segment areas is a black area, a part of the segment areas is a comment area, and the rest of the segment areas is a monochrome area or a color area. Based on the arrangement of a monochrome area, a color area, a black area and a comment area in the four segment areas, the segment area determination unit 1313 regards a black segment area and a comment segment area, out of the four segment areas, as a monochrome area or a color area respectively, and updates the rectangular areas which were set in step S204.

The processing in step S205 according to this example will now be described in detail.

In this example, the concave pattern has the following patterns in (4) and (5), in addition to the patterns in (1) to (3) described in Example 3.

(4) One or three segment areas is/are a comment area and the rest of the segment areas is a color area, or one or three segment areas is/are a comment area and the rest of the segment areas is a monochrome area.

Figure 22:
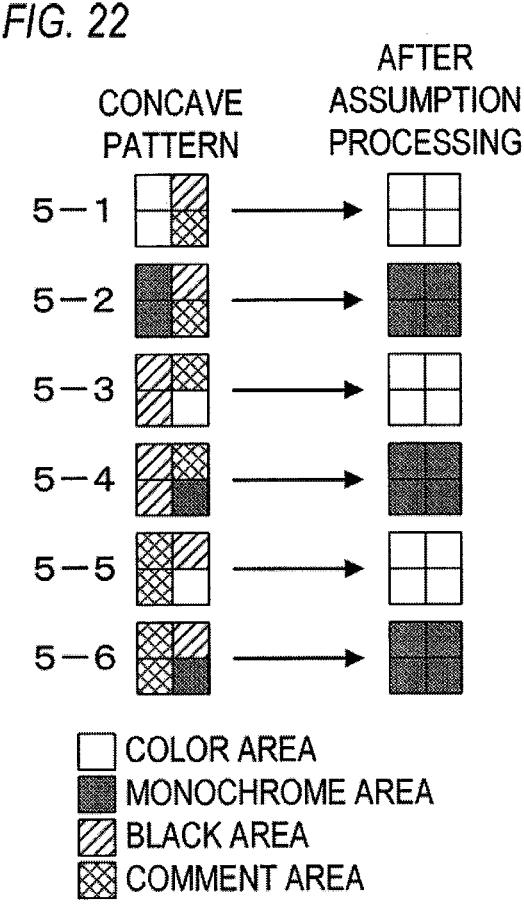
FIG. 22 shows an example of a concave pattern and a processing result of assumption processing according to Example 4.

(5) Three types of segment areas, including a black area and comment area, exist, and the types of two adjacent segment areas are the same (5-1 to 5-6 in FIG. 22).

The pattern in (2) described in Example 3 includes the patterns in 2-1 to 2-3 in FIG. 19, where the black area is replaced with a comment area.

If the four segment areas in two rows by two columns total four types of segment areas, that is a color area, a monochrome area, a comment area and a black area, then these four segment areas are not determined as a concave areas in step S802.

In this example, in step S805 in FIG. 18, a black segment area and a comment segment area are regarded as a monochrome area or a color area respectively (assumption processing).

In concrete terms, if a concave pattern is one of the patterns in (1) to (3), the black segment area is regarded as a monochrome area or a color area, just like Example 3. If a concave pattern is the patterns in 2-1 to 2-3 in FIG. 19 where the black area is replaced with a comment area, then the processing described in the assumption processing according to Example 1 (assumption processing in the case when the concave pattern is the pattern in (2)) is performed (the "black area" in this description is read as a "comment area" in the case of this example). Thereby the monochrome segment area is regarded as a color area or a monochrome area. If a concave pattern is the pattern in (4), the processing is performed, as described in the assumption processing for cases where the concave pattern in (1) is the pattern in (1) according to Example 3, by reading the "black area" in the assumption processing as "comment area" in this processing. Thereby the monochrome segment area is regarded as a color area or a monochrome area.

If a concave pattern is the pattern in (5), as shown in FIG. 22 a monochrome segment area is regarded as a color area or a monochrome area, so that all the segment areas in the concave area becomes color areas or monochrome areas.

As described above, according to this example, it is determined, for each segment area, whether the segment area is a monochrome area, a color area, a black area or a comment area. A segment area determined as a black area and a segment area determined as a comment area are regarded as a monochrome area or a color area respectively, so as to decrease a number of rectangular areas to be the targets of the image processing. Thereby in the image processing apparatus that executes image processing for each rectangular area, the processing load required for performing image processing independently for a monochrome area and a color area can be decreased without dropping the accuracy to detect a monochrome area and a color area.

Furthermore, according to this example, a black segment area and a comment segment area are regarded as a monochrome area or a color area respectively, based on a concave pattern. Thereby a black segment area and a comment segment area can be accurately regarded as a monochrome area or a color area respectively. For example, if a comment segment area is an area in a color image, regarding this segment area as a monochrome area in error can be prevented. In the same manner, if a comment segment area is in an area in a monochrome area, regarding this segment area as a color area in error can be prevented. As a result, image quality interference, such as brightness step difference in a color image or in a monochrome image can be suppressed.

To combine Example 4 and Example 1, the segment area determination unit 1313 and the rectangular area setting unit 1314 of Example 4 are disposed in the monochrome area decision unit 108 of Example 1, for example. Then as post-processing of the monochrome area decision processing according to Example 1, the segment area determination processing and the rectangular area setting processing are executed. To combine Example 4 and Example 2, the segment area determination unit 1313 and the rectangular area setting unit 1314 of Example 4 are disposed in the monochrome/color area decision unit 1106 of Example 2, for example. Then as post-processing of the monochrome area decision processing according to Example 4, the segment area determination processing and the rectangular area setting processing are executed.

In concrete terms, a black area and a comment area are detected for each segment area by the segment area determination processing (processing to determine whether the segment area is a monochrome area, a color area, a black area or a comment area) of Example 4. For a segment area which was not determined as a black area and a segment area which was not determined as a comment area, the determination result of the monochrome area decision processing is used. Then using the method of Example 4, the segment area determined as a black area and the segment area determined as a comment area are regarded as a monochrome area or a color area respectively.

In the case of combining Example 4 and Example 1, or in the case of combining Example 4 and Example 2, the segment area determination processing is performed on a segment area which is a pixel group constituted by H×J pixels or less. In other words, for each pixel group constituted by H×J pixels or less, it is determined whether this pixel group is a monochrome area, a color area, a black area or a comment area. A pixel group constituted by H×J pixels or less is, for example, a pixel group constituted by K×J pixels, or a pixel group constituted by pixels less than K×J pixels.

Example 5

The case of executing Example 3 in combination with Example 1 will be described in detail in this example. In this example, the monochrome/color area decision unit 108 of Example 1 has the segment area determination unit 103 and the rectangular area setting unit 1314 of Example 3. As post-processing of the monochrome/color area decision processing according to Example 1, the segment area determination processing and the rectangular area setting processing of Example 3 are executed. Based on the same concept as this example, Example 3 may be executed in combination with Example 2.

Figure 20B:
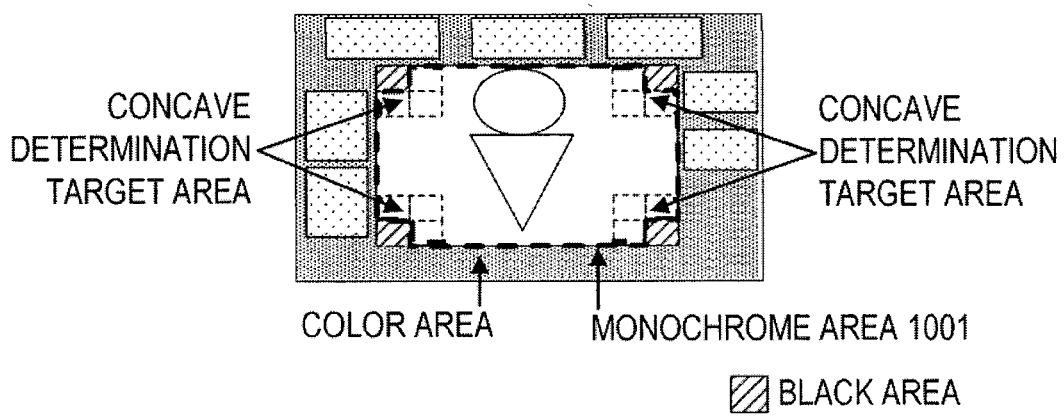

FIG. 20B shows a state of extending the monochrome area 1001, determined by the monochrome/color area decision unit 108 of Example 1 (see FIG. 6C of Example 1), by applying the processing of Example 3, so that the monochrome area is corrected to be a rectangular area.

In this example, the segment area determination unit 1313 determines, for each pixel group constituted by K×L pixels, whether this pixel group is a black area or not. If the pixel group is not a black area, the determination result in the monochrome area decision processing of Example 1 is used for the pixel group. In this example, as shown in FIG. 20B it is assumed that the concave portions of the monochrome area 1001 are detected as black areas.

Based on the determination result of the segment area determination unit 1313, the rectangular area setting unit 1314 combines one or a plurality of same type pixel groups and sets rectangular areas. Based on the determination result of the segment area determination unit 1313, the rectangular area setting unit 1314 determines each pixel group in two rows by two columns in the upper right color, lower right corner, upper left corner and lower left corner (each pixel group in two rows by two columns including the pixel group determined as a black area) of the monochrome area 1001 as a concave determination target area. For each concave determination target area, the rectangular areas setting unit 1314 determines whether the pattern of this concave determination target area matches the concave patterns shown in FIG. 19 of Example 3. The rectangular area setting unit 1314 regards the black area as a monochrome area or a color area according to the concave pattern determination result, and changes (updates) the rectangular areas which are currently set.

In the example of FIG. 20B of Example 3, all the patterns of the four concave determination target areas match the concave pattern in 1-2 in FIG. 19. Therefore the processing to regard the four black areas as monochrome areas (assumption processing) is executed, and the rectangular areas which are currently set are updated. As a result, one square area constituted by the monochrome area 1001 and the four black areas is set as a monochrome area. Thus concave areas at the upper right corner, lower right corner, upper left corner and lower left corner of the monochrome area 1001 can be eliminated.

According to this example, just like Example 3, in the image processing apparatus that executes image processing for each rectangle area, the processing load required for performing image processing independently for a monochrome area and a color area can be decreased without dropping the accuracy to detect a monochrome area and a color area. In concrete terms, a drop in accuracy to detect a monochrome area and a color area can be suppressed, since the size of the segment area to be a target of determining whether the area is a monochrome area, a color area or a black area, need not be increased compared with the prior art. Furthermore, the processing load in the image processing can be decreased compared with the prior art, since a number of rectangular areas to be the targets of the image processing can be decreased compared with the prior art.

In this example, a case of extending the monochrome area to be a square area and setting the square area was described, but the color area may be extended to be a square area and set in the same manner. In the case of an input image having a color background, a monochrome area is detected and determined as mentioned above, and in the case of an input image having a monochrome background, a color area is detected and determined.

Example 6

An image processing apparatus and a method for controlling the image processing apparatus according to Example 6 of the present invention will now be described with reference to the drawings. In this example, it is assumed that a rectangular area constituted by a first pixel group determined as a monochrome area is detected as a horizontal monochrome area, and a rectangular area constituted by a second pixel group determined as a monochrome area is detected as a vertical monochrome area. A method for determining, for each first pixel group, whether this pixel group is a monochrome area or a color area, and a method for determining, for each second pixel group, whether this pixel group is a monochrome area or a color area, are the same as Example 1.

In some cases, if the method of Example 1 is used for the processing, an edge of a color image may be determined as a monochrome area in error, which generates a brightness step difference due to the difference of the γ values that are set, and causes image quality interference.

The principle of generation of the image quality interference will be described hereinbelow.

Figure 23:
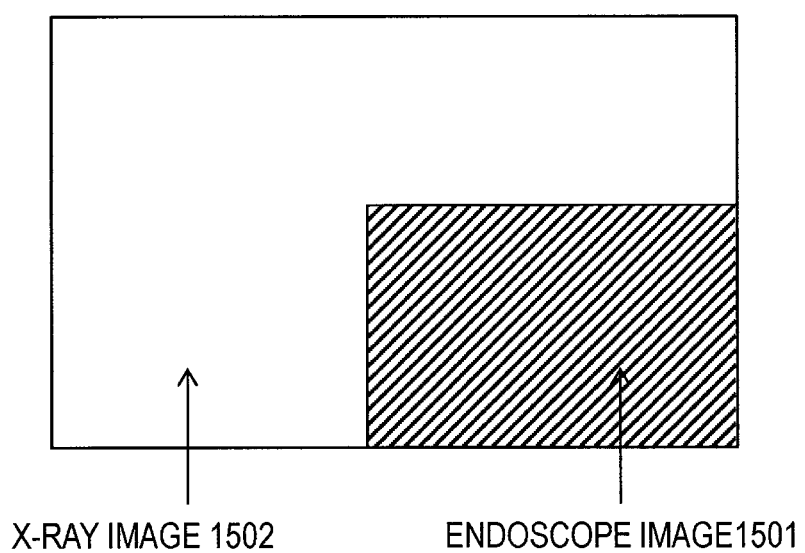
FIG. 23 shows an example of an input image.

FIG. 23 shows an example of an input image 101. In the example in FIG. 23, the input image 101 is a combined image of an endoscope image 1501 (shaded portion in FIG. 23) and an X-ray image 1502 (white portion in FIG. 23). The endoscope image 1501 is a color image, and the X-ray image 1502 is a monochrome image.

Figure 25A:
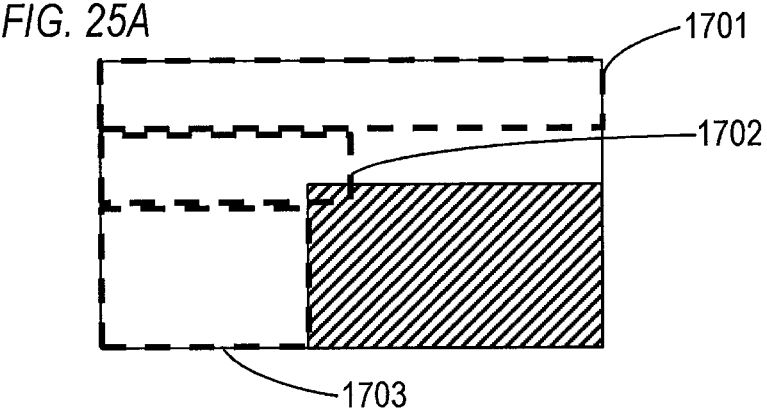
FIG. 25A to FIG. 25C show an example of a monochrome area according to Example 6.

FIG. 24 shows buffer monochrome ratios 1605 to 1607 detected by the horizontal monochrome/color area detection unit 106. A buffering area 1601 (indicated by a bold frame), of which frame count value=3, includes an upper left edge of the endoscope image 1501, but is determined as a horizontal monochrome area since the buffer monochrome ratio is 95% or more. FIG. 25A indicates horizontal monochrome areas 1701 to 1703 detected by the horizontal monochrome/color area detection unit 106. As FIG. 25A shows, the upper left edge of the endoscope image 1501 is detected as a horizontal monochrome area 1702.

Figure 25B:
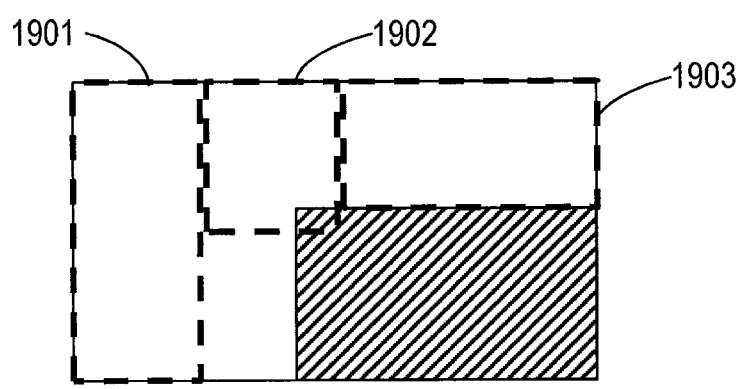

FIG. 26 shows buffer monochrome ratios 1805 to 1807 detected by the vertical monochrome/color area detection unit 107. A buffering area 1801 (indicated by a bold frame), of which frame count value=5, includes an upper left edge of the endoscope image 1501, but is determined as a vertical monochrome area since the buffer monochrome ratio is 95% or more. FIG. 25B indicates vertical monochrome areas 1901 to 1903 detected by the vertical monochrome/color area detection unit 107. As FIG. 25B shows, the upper left edge of the endoscope image 1501 is detected as a vertical monochrome area 1902.

Figure 25C:
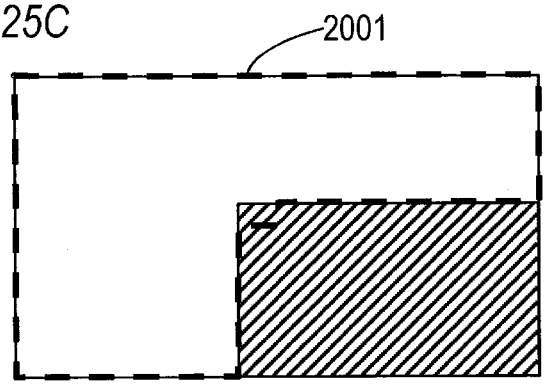

The monochrome/color area decision unit 108 determines the OR area of the detected horizontal monochrome areas 1701 to 1703 and the vertical monochrome areas 1901 to 1903, as the final monochrome area. FIG. 25C indicates the final monochrome area 2001 by a broken line. As FIG. 25C shows, the monochrome area 2001 includes the upper left edge of the endoscope image 1501. As a result, DICOM γ correction is performed on the upper left edge of the endoscope image 1501, and γ correction with γ=2.2 is performed on the rest of the area of the endoscope image 1501 (area other than the upper left edge), whereby image quality interference is generated due to the brightness step difference.

In this example, a method for decreasing the image quality interference will be described.

Figure 27:
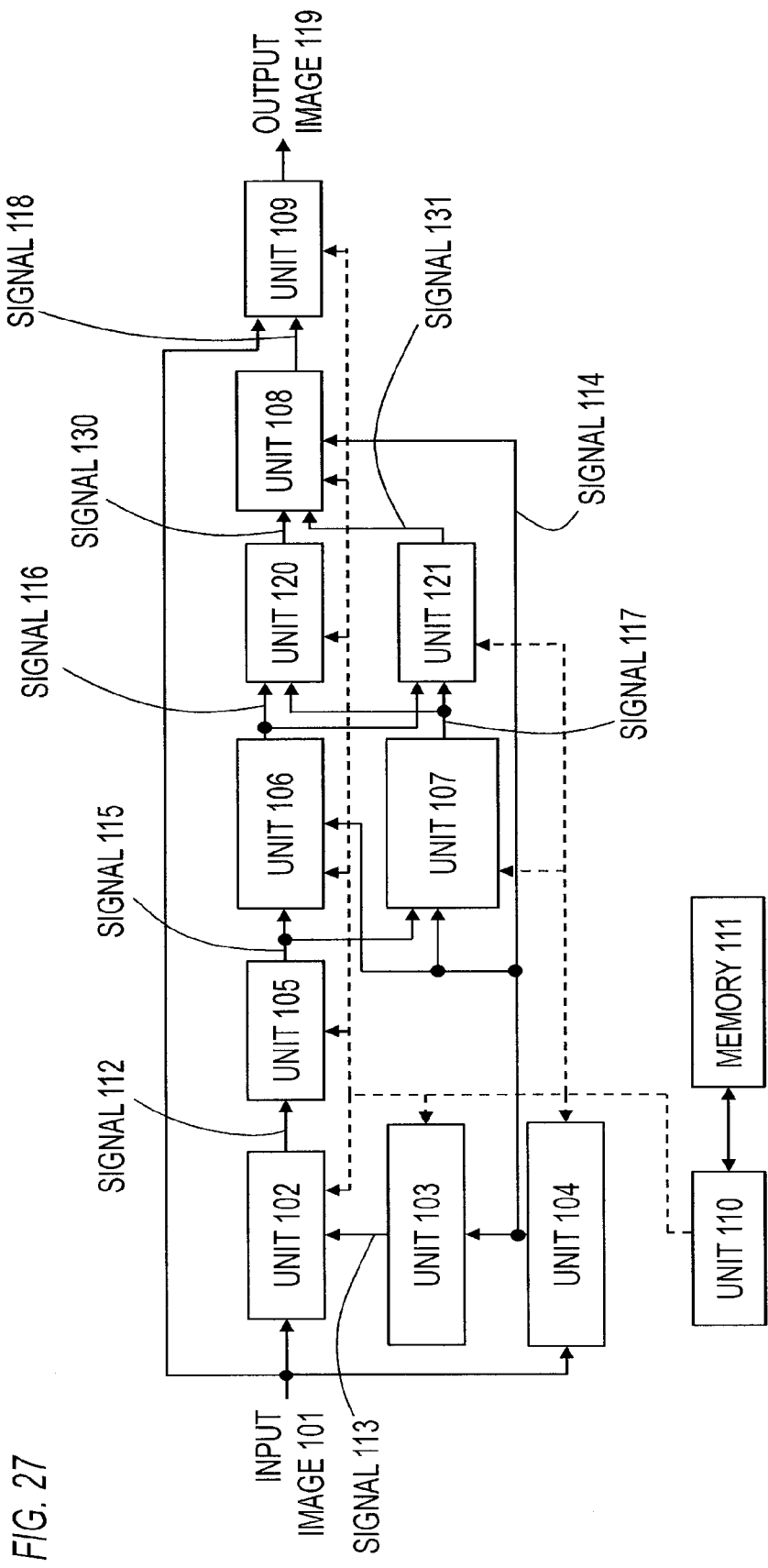
FIG. 27 is a block diagram depicting an example of a functional configuration of an image processing apparatus according to Example 6.

FIG. 27 is a block diagram depicting the image processing apparatus of this example. A function the same as Example 1 is denoted with a same reference number, for which description is omitted. In this example, the above mentioned image quality interference (brightness step difference) is decreased by the horizontal area correction unit 120 and the vertical area correction unit 121.

A case when the input image is the input image 101 in FIG. 23 will be described.

A horizontal monochrome area signal 116 which indicates the horizontal monochrome areas 1701 to 1703 shown in FIG. 25A is outputted from the horizontal monochrome/color area detection unit 106 to a horizontal area correction unit 120 and a vertical area correction unit 121. A vertical monochrome area signal 117, which indicates vertical monochrome areas 1901 to 1903 shown in FIG. 25B, is outputted from a vertical monochrome/color area detection unit 107 to a vertical area correction unit 120 and a vertical area correction unit 121.

In this example, it is assumed that the horizontal monochrome/color area detection unit 106 and the vertical monochrome/color area detection unit 107 are set by the user, so that a horizontal monochrome area and a vertical monochrome area are detected regardless of the content of the input image. However as described in Example 1, whether the input image has a color background or a monochrome background may be determined. The horizontal monochrome/color area detection unit 106 and the vertical monochrome/color area detection unit 107 may be set by the user, so that a horizontal monochrome area and a vertical monochrome area are detected if the input image has a color background.

The horizontal area correction unit 120 sets neighbor points for a horizontal monochrome area of which height in the vertical direction is the same as the height of the predetermined area (segment area). The vertical area correction unit 121 sets neighbor points for a vertical monochrome area of which width in the horizontal direction is the same as the width of the predetermined area (segment area).

Figure 28A:
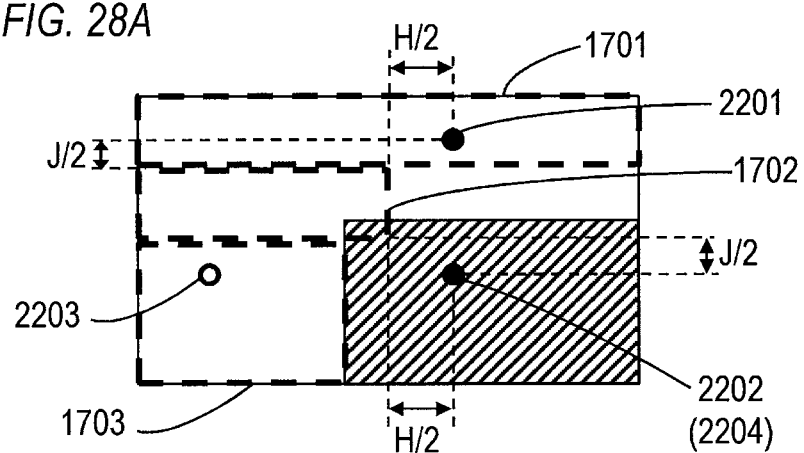
FIG. 28A and FIG. 28B show an example of processing of a horizontal/vertical area correction unit according to Example 6.
Figure 28B:
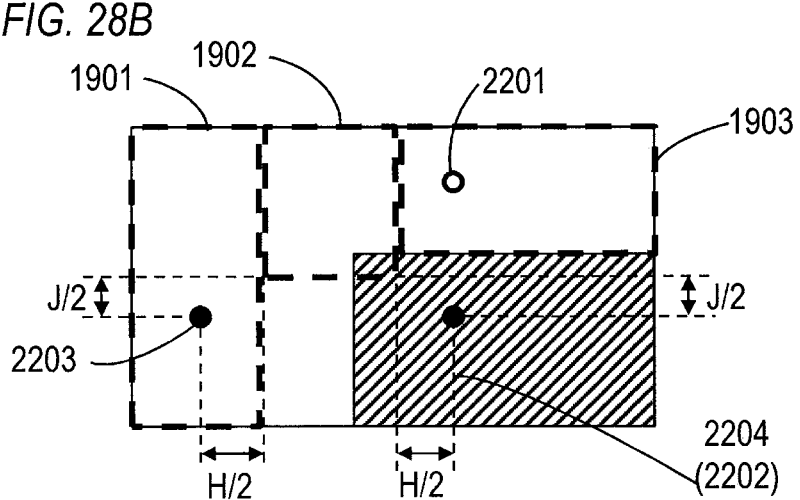

Now the "neighbor points" detected by the horizontal area correction unit 120 or the vertical area correction unit 121 will be described. FIG. 28A and FIG. 28B are diagrams depicting "neighbor points".

For the horizontal monochrome area of which height in the vertical direction is the height of the segment area, that is a height of J pixels, the horizontal area correction unit 120 sets, as neighbor points, points which are outside the horizontal monochrome area and near the four vertexes of the horizontal monochrome area. Out of the four neighbor points which were set for the horizontal monochrome area, a neighbor point located above (Y coordinate value is smaller) the horizontal monochrome area is called an "upper neighbor point", and a neighbor point located below (Y coordinate value is greater) the horizontal monochrome area is called a "lower neighbor point". If a neighbor point is outside the image area of the input image 101, it is regarded that this neighbor point does not exist. In this example, a point that is H/2 pixels away from the vertex of the setting target horizontal monochrome area in the horizontal direction and J/2 pixels outward from the vertex in the vertical direction is set as a neighbor point. The distance between the vertex of the horizontal monochrome area and a neighbor point is not limited to this, but it is preferable that the distance in the horizontal direction is one pixel or more and H pixels or less, and the distance in the vertical direction is one pixel or more but J pixels or less.

FIG. 28A shows the horizontal monochrome areas 1701 to 1703 and the neighbor points. In FIG. 28A, the neighbor point 2201 is an upper neighbor point of the horizontal monochrome area 1702, and the neighbor point 2202 is a lower neighbor point thereof. An upper neighbor point located at the left side of the horizontal monochrome area 1702 and a lower neighbor point located at the left side thereof, which are located outside the image area of the input image 101, are regarded as nonexistent. A neighbor point of the horizontal monochrome area 1701, which is also located outside the image area of the input image 101, is regarded as nonexistent. No neighbor point is set for the horizontal monochrome area 1703, since the height in the vertical direction is not the height of J pixels.

Neighbor points are also set in the same manner for a vertical monochrome area of which width in the horizontal direction is the same as the width of the predetermined area (segment area). In concrete terms, for the vertical monochrome area of which width in the horizontal direction is the width of the segment area, that is a width of H pixels, the vertical area correction unit 121 sets, as neighbor points, points which are outside the vertical monochrome area and near the four vertexes of the vertical monochrome area. Out of the four neighbor points which were set for the vertical monochrome area, a neighbor point located at the right (X coordinate value is greater) of the vertical monochrome area is called a "right neighbor point", and a neighbor point located at the left (X coordinate value is smaller) of the vertical monochrome area is called a "left neighbor point".

FIG. 28B shows the vertical monochrome areas 1901 to 1903 and the neighbor points. In FIG. 28B, the neighbor point 2204 is a right neighbor point of the vertical monochrome area 1902, and the neighbor point 2203 is a left neighbor point thereof. A right neighbor point located above the vertical monochrome area 1902 and a left neighbor point located above the vertical monochrome area 1902, which are located outside the image area of the input image 101, are regarded as nonexistent. A neighbor point of the vertical monochrome area 1901, which is also located outside the image area of the input image 101, is regarded as nonexistent. No neighbor point is set for the vertical monochrome area 1903, since the width in the horizontal direction is not the width of H pixels. In FIG. 28A and FIG. 28B, the neighbor point 2202 and the neighbor point 2204 are located in the same coordinates.

If at least one of an upper neighbor point and a lower neighbor point of a horizontal monochrome area is included in a vertical monochrome area, the horizontal area correction unit 120 determines that the horizontal monochrome area includes an edge of a color area, and corrects this horizontal monochrome area. Details of this will now be described.

First, the horizontal area correction unit 120 sets a neighbor point for a horizontal monochrome area of which height in the vertical direction is the same as the height of a predetermined area (segment area). In concrete terms, the horizontal area correction unit 120 detects a neighbor point for a horizontal monochrome area of which height in the vertical direction is the same as the height of the predetermined area (segment area), and calculates the coordinates of the neighbor point. In the case of FIG. 28A, the coordinates of the neighbor points 2201 and 2202 of the horizontal monochrome area 1702 are calculated. Then the horizontal area correction unit 120 determines whether the neighbor points 2201 and 2202 are included in a vertical monochrome area. As FIG. 28B shows, the upper neighbor point 2201 of the horizontal monochrome area 1702 is included in the vertical monochrome area 1903. The lower neighbor point 2202, on the other hand, is not included in any vertical monochrome areas.

If there is a horizontal monochrome area where at least one of the upper neighbor point and the lower neighbor point is included in a vertical monochrome area, the horizontal area correction unit 120 corrects the horizontal monochrome area by the following methods.

(1) If the upper neighbor point is included in vertical monochrome area, an X coordinate value (position in the horizontal direction) of a side closer to the included upper neighbor point, out of the right side and the left side of the horizontal monochrome area, is matched with an X coordinate of a side of a horizontal monochrome area, which is below and adjacent to the horizontal monochrome area.

(2) If the lower neighbor point is included in a vertical monochrome area, an X coordinate value of a side closer to the included lower neighbor point, out of the right side and the left side of the horizontal monochrome area, is matched with an X coordinate value of a side of a horizontal monochrome area, which is above and adjacent to the horizontal monochrome area.

Figure 29A:
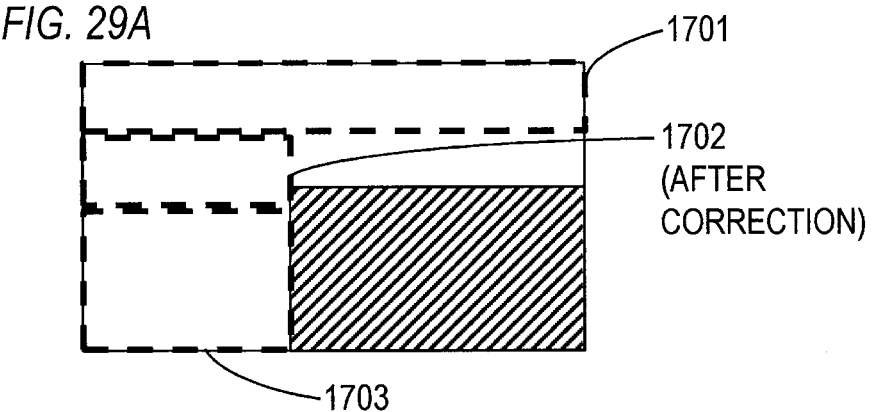
FIG. 29A to FIG. 29C show an example of processing of the image processing apparatus according to Example 6.

In the case of FIG. 28A, only the upper neighbor point 2201 of the horizontal monochrome area 1702 is included in the vertical monochrome area, hence the correction in (1) is executed. FIG. 29A shows a correction of the horizontal monochrome area 1702 by the horizontal area correction unit 120. As FIG. 29A shows, the right side of the horizontal monochrome area 1702 is corrected so that the X coordinate value thereof matches with the X coordinate value of the right side of the horizontal monochrome area 1703, which is below and adjacent to the horizontal monochrome area 1702.

The horizontal area correction area 120 outputs a signal that indicates the horizontal monochrome areas 1701 and 1703 and the corrected horizontal monochrome area 1702 as a horizontal correction area signal 130.

If at least one of a right neighbor point and a left neighbor point of a vertical monochrome area is included in a horizontal monochrome area, the vertical area correction unit 121 determines that the vertical monochrome area includes an edge of a color area, and corrects this vertical monochrome area. Details of this will now be described.

First, the vertical area correction unit 121 sets a neighbor point for a vertical monochrome area of which width in the horizontal direction is the same as the width of a predetermined area (segment area). In concrete terms, the vertical area correction unit 121 detects a neighbor point for a vertical monochrome area of which width in the horizontal direction is the same as the width of the predetermined area (segment area), and calculates the coordinates of the neighbor point. In the case of FIG. 28B, the coordinates of the neighbor points 2203 and 2204 of the vertical monochrome area 1902 are calculated. Then the vertical area correction unit 121 determines whether the neighbor points 2203 and 2204 are included in a horizontal monochrome area. As FIG. 28A shows, the left neighbor point 2203 of the vertical monochrome area 1902 is included in the horizontal monochrome area 1703. The right neighbor point 2204, on the other hand, is not included in any horizontal monochrome areas.

If there is a vertical monochrome area where at least one of the right neighbor point and the left neighbor point is included in a horizontal monochrome area, the vertical area correction unit 121 corrects the vertical monochrome area by the following methods.

(3) If the left neighbor point is included in a horizontal monochrome area, a Y coordinate value (position in the vertical direction) of a side closer to the included left neighbor point, out of the upper side and the lower side of the vertical monochrome area, is matched with a Y coordinate value of a side of a vertical monochrome area which is at the right and adjacent to the vertical monochrome area.

(4) If the right neighbor point is included in a horizontal monochrome area, a Y coordinate value of a side closer to the included right neighbor point, out of the upper side and the lower side of the vertical monochrome area, is matched with a Y coordinate value of a side of a vertical monochrome area which is at the left and adjacent to the vertical monochrome area.

Figure 29B:
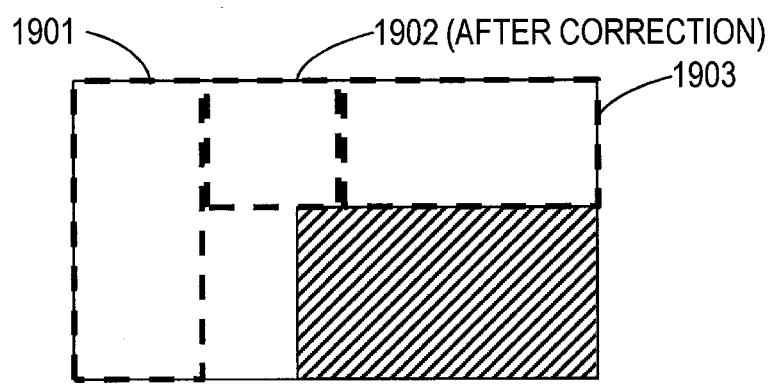

In the case of FIG. 28B, only the left neighbor point 2203 of the vertical monochrome area 1902 is included in the horizontal monochrome area, hence the correction in (3) is executed. FIG. 29B shows a correction of the vertical monochrome area 1902 by the vertical area correction unit 121. As FIG. 29B shows, the lower side of the vertical monochrome area 1902 is corrected so that the Y coordinate value thereof matches with the Y coordinate value of the lower side of the vertical monochrome area 1903 which is at the right and adjacent to the vertical monochrome area 1902.

The vertical area correction unit 121 outputs a signal that indicates the vertical monochrome areas 1901 and 1903 and the corrected vertical monochrome area 1902 as a vertical correction area signal 131.

The monochrome/color area decision unit 108 determines a monochrome area based on the horizontal correction area signal 130 and the vertical correction area signal 131, using a method similar to Example 1, and outputs a monochrome area signal 118.

Figure 29C:
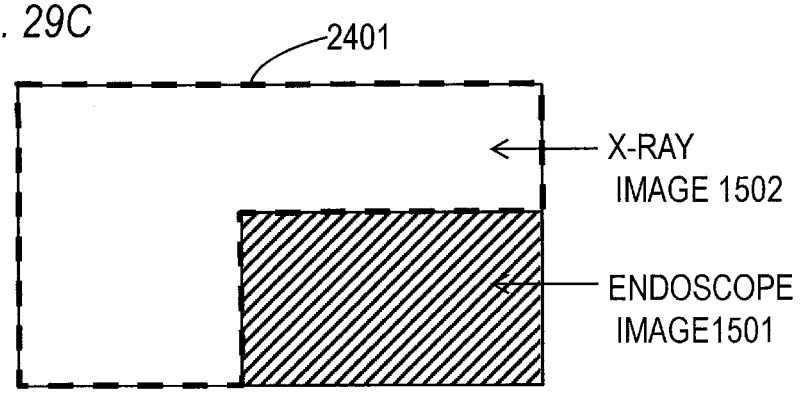

FIG. 29C shows a final monochrome area 2401 detected by the monochrome/color area decision unit 108. As FIG. 29C shows, according to this example, the monochrome area 2401 does not include the upper left edge of the endoscope image 1501, and the image quality interference due to the brightness step difference can be decreased.

Example 7

An image processing apparatus and a method for controlling the image processing apparatus according to Example 7 of the present invention will now be described with reference to the drawings.

In Example 6, an example of detecting a horizontal monochrome area and a vertical monochrome area was described, but in Example 7, an example of detecting a horizontal color area and a vertical color area will be described. In concrete terms, according to this example, it is assumed that a rectangular area constituted by a first pixel group, which was determined as a color area, is detected as a horizontal color area, and a rectangular area constituted by a second pixel group, which was determined as a color area, is detected as a vertical color area. A method for determining, for each first pixel group, whether this pixel group is a monochrome area or a color area, and a method for determining, for each second pixel group, whether this pixel group is a monochrome area or a color area are the same as Example 1.

In the case when there is only one color rectangular area in the input image 101, like the case of FIG. 23, a number of areas to be detected becomes less, and area setting becomes simplified if a horizontal color area and a vertical color area are detected.

Figure 30:
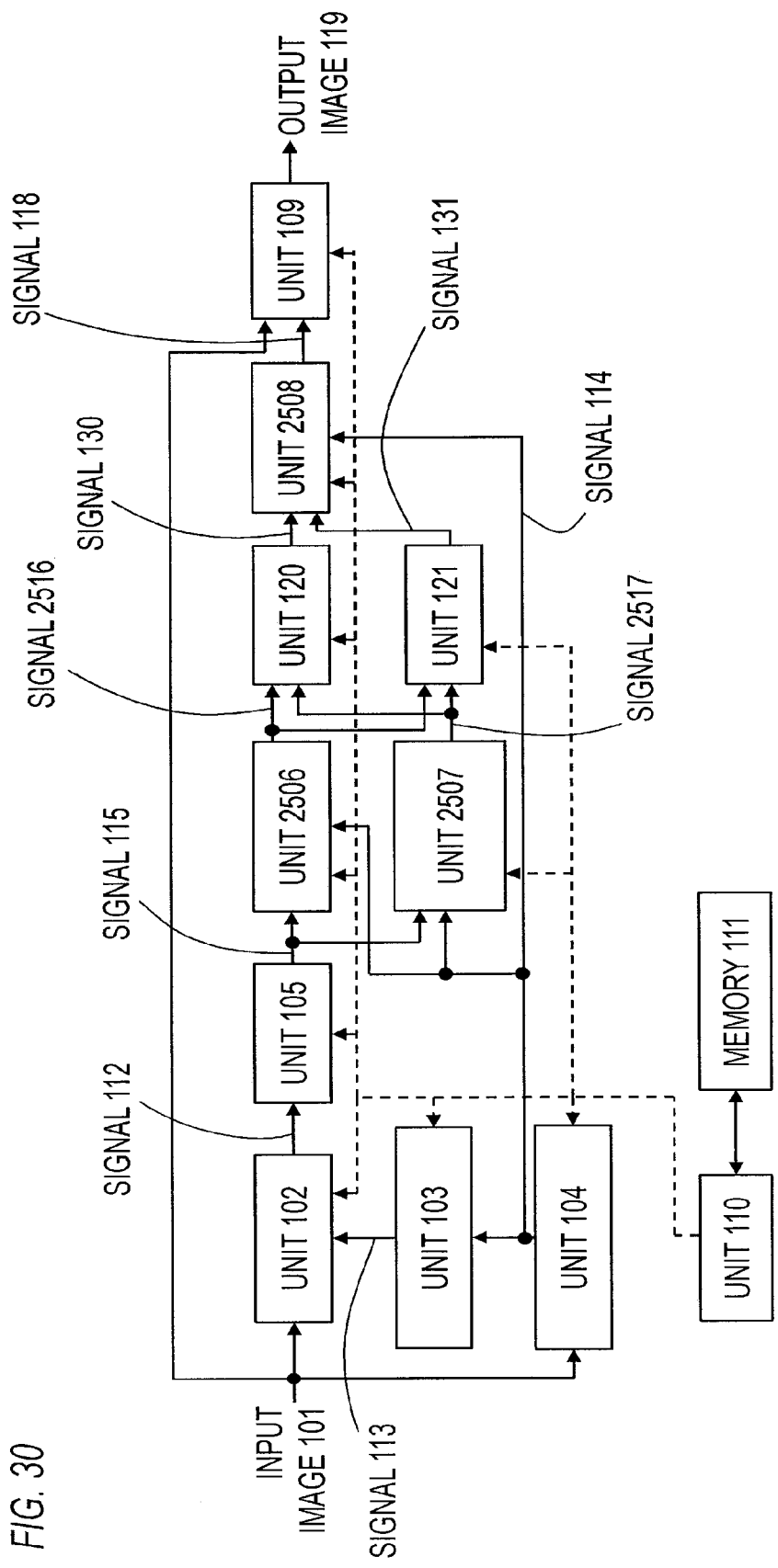
FIG. 30 is a block diagram depicting an example of a functional configuration of an image processing apparatus according to Example 7.

FIG. 30 is a block diagram depicting the image processing apparatus of this example. Each function of the image processing apparatus according to this example will now be described. A function the same as Example 1 is denoted with a same reference number, for which description is omitted. In this example, a horizontal monochrome/color area detection unit 2506, a vertical monochrome/color area detection unit 2507, and a monochrome/color area decision unit 2508 are different from Example 6.

A case when the input image is the input image 101 in FIG. 23 will be described.

In this example, it is assumed that the horizontal monochrome/color area detection unit 2506 and the vertical monochrome/color area detection unit 2507 are set by the user, so that a horizontal monochrome area and a vertical monochrome area are detected regardless of the content of the input image. However as described in Example 1, whether the input image has a color background or a monochrome background may be determined. The horizontal monochrome/color area detection unit 2506 and the vertical monochrome/color area detection unit 2507 may be set by the user, so that a horizontal monochrome area and a vertical monochrome area are detected if the input image has a color background.

The horizontal monochrome/color area detection unit 2506 calculates a horizontal color area signal 2516 from a monochrome ratio signal 115 and a frame count value 114.

Figure 31A:
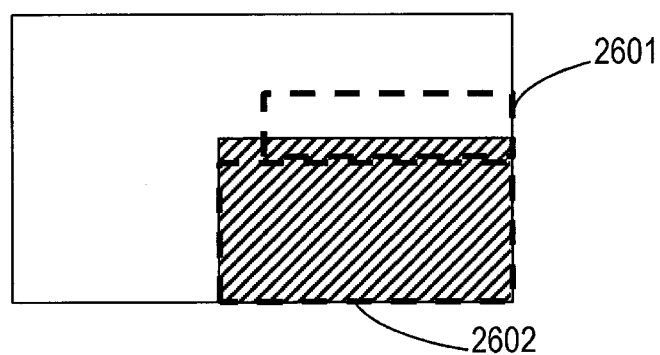
FIG. 31A and FIG. 31B show an example of a horizontal/vertical color area according to Example 7.

The horizontal monochrome/color area detection unit 2506 detects buffer monochrome ratios 1605 to 1607 shown in FIG. 24 by processing similar to the horizontal monochrome/color area detection unit 106 of Example 6. Then the horizontal monochrome/color area detection unit 2506 detects an area, which is constituted by a buffering area (first pixel group) of which buffer monochrome ratio 1607 is less than 95%, as a horizontal color area. The broken line in FIG. 31A shows a horizontal color area detected by the horizontal monochrome/color area detection unit 2506. As FIG. 31A shows, two areas, that is the horizontal color areas 2601 and 2602, are detected in this example. The horizontal monochrome/color area detection unit 2506 outputs a signal that indicates the detected horizontal color areas 2601 and 2602 to the horizontal area correction unit 120 and the vertical area correction unit 121 as the horizontal color area signal 2516.

The vertical monochrome/color area detection unit 2507 calculates a vertical color area signal 2517 from the monochrome ratio signal 115 and the frame count value 114.

Figure 31B:
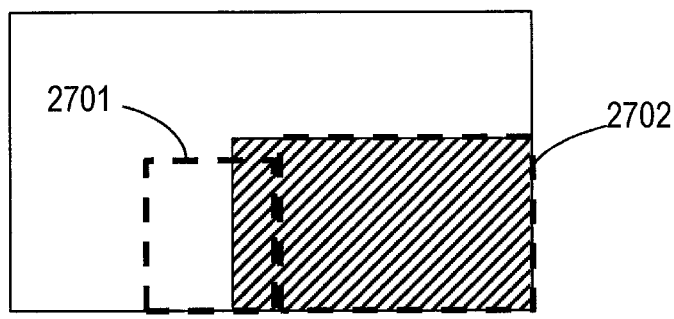

The vertical monochrome/color area detection unit 2507 detects buffer monochrome ratios 1805 to 1807 shown in FIG. 26 by processing similar to the vertical monochrome/color area detection unit 107 of Example 6. Then the vertical monochrome/color area detection unit 2507 detects an area, which is constituted by a buffering area (second pixel group) of which buffer monochrome ratio 1807 is less than 95%, as a vertical color area. The dotted line in FIG. 31B shows a vertical color area detected by the vertical monochrome/color area detection unit 2507. Two areas, that is the vertical color areas 2701 and 2702, are detected in this example, as shown in FIG. 31B. The vertical monochrome/color area detection unit 2507 outputs a signal that indicates the detected vertical color areas 2701 and 2702 to the horizontal area correction unit 120 and the vertical area correction unit 121 as the vertical color area signal 2517.

In order to decrease the image interference due to the brightness step difference, just like Example 6, the horizontal area correction unit 120 corrects the horizontal color area. Then the horizontal area correction unit 120 generates a horizontal correction area signal 130 from the horizontal color area signal 2516 and the vertical color area signal 2517, and outputs the horizontal correction area signal 130.

In order to decrease the image interference due to the brightness step difference, just like Example 6, the vertical area correction unit 121 corrects the vertical color area. Then the vertical area correction unit 121 generates a vertical correction area signal 131 from the horizontal color area signal 2516 and the vertical color area signal 2517, and outputs the vertical correction area signal 131.

Figure 32A:
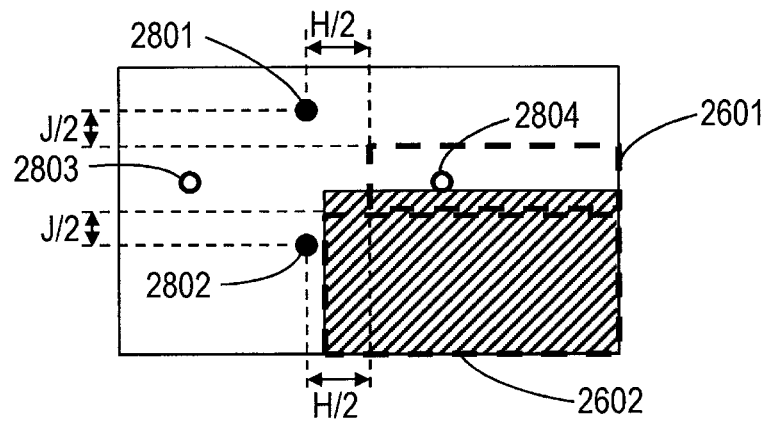
FIG. 32A and FIG. 32B show an example of a horizontal/vertical area correction unit according to Example 7.
Figure 32B:
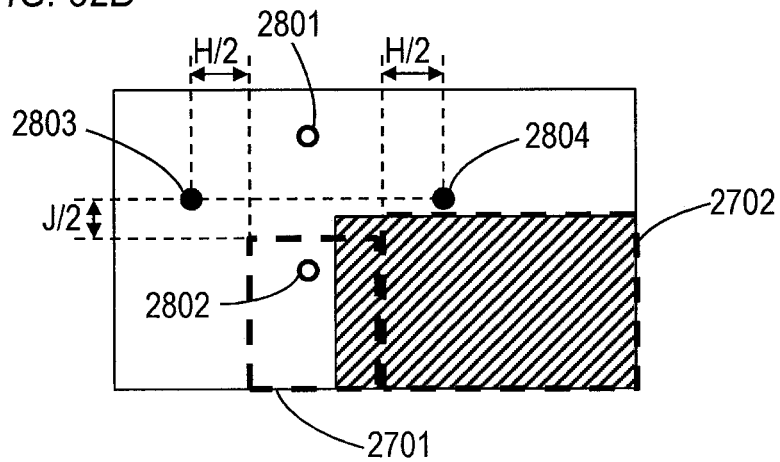

First, based on the horizontal color area signal 2516, the horizontal area correction unit 120 sets a neighbor point for a horizontal color area of which height in the vertical direction is the same as the height of a predetermined area. In concrete terms, the horizontal area correction unit 120 calculates the coordinates of a neighbor point for a horizontal monochrome area of which height in the vertical direction is the same as the height of the predetermined area (segment area). Also based on the vertical color area signal 2517, the vertical area correction unit 121 sets a neighbor point for a vertical color area of which width in the horizontal direction is the same as the width of the predetermined area. In concrete terms, the vertical area correction unit 121 calculates the coordinates of the neighbor point for a vertical monochrome area of which width in the horizontal direction is the same as the width of the predetermined area. The method for setting a neighbor point is the same as Example 6. FIG. 32A shows neighbor points determined by the horizontal area correction unit 120. The neighbor point 2801 shown in FIG. 32A is an upper neighbor point of the horizontal color area 2601, and the neighbor point 2802 is a lower neighbor point of the horizontal color area 2601. FIG. 32B shows neighbor points determined by the vertical area correction unit 121. The neighbor point 2803 shown in FIG. 32B is a left neighbor point of the vertical color area 2701, and the neighbor point 2804 is a right neighbor point of the vertical color area 2701.

If there is a horizontal color area where at least one of the upper neighbor point and the lower neighbor point is included in a vertical color area, the horizontal area correction unit 120 corrects the horizontal color area by the following methods.

(5) If the upper neighbor point is included in a vertical color area, an X coordinate value of a side closer to the included upper neighbor point, out of the right side and the left side of the horizontal color area, is matched with an X coordinate value of a side of a horizontal color area, which is above and adjacent to the horizontal color area.

(6) If the lower neighbor point is included in a vertical color area, an X coordinate value of a side closer to the included lower neighbor point, out of the upper side and the lower side of the horizontal color area, is matched with an X coordinate value of a side of a horizontal color area, which is below and adjacent to the horizontal color area.

Figure 33A:
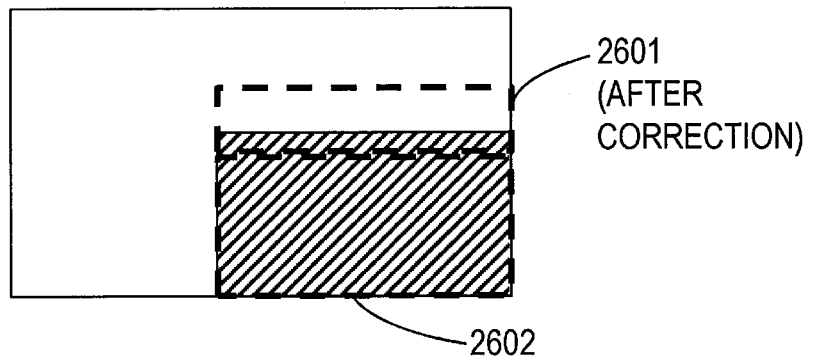
FIG. 33A to FIG. 33C show an example of processing of the image processing apparatus according to Example 7.

In the case of FIG. 32A, only the lower neighbor point 2802 of the horizontal color area 2601 is included in the vertical color area 2701, hence the correction in (6) is executed. FIG. 33A shows a correction of the horizontal color area 2601 by the horizontal area correction unit 120. As FIG. 33A shows, the left side of the horizontal color area 2601 is corrected so that the X coordinate value thereof matches with the X coordinate value of the left side of a horizontal color area 2602, which is below and adjacent to the horizontal color area 2601. The horizontal area correction unit 120 outputs a signal that indicates the corrected horizontal color area 2601 and the horizontal color area 2602 as a horizontal correction area signal 130.

If there is a vertical color area where at least one of the right neighbor point and the left neighbor point is included in a horizontal color area, the vertical area correction unit 121 corrects the vertical color area by the following methods.

(7) If the left neighbor point is included in a horizontal color area, a Y coordinate value of a side closer to the included left neighbor point, out of the upper side and the lower side of a vertical color area, is matched with a Y coordinate value of a side of a vertical color area which is at the left and adjacent to the vertical color area.

(8) If the right neighbor point is included in a horizontal color area, a Y coordinate value of a side closer to the included right neighbor point, out of the upper side and the lower side of the vertical color area, is matched with a Y coordinate value of a side of a vertical color area, which is at the right and adjacent to the vertical color area.

Figure 33B:
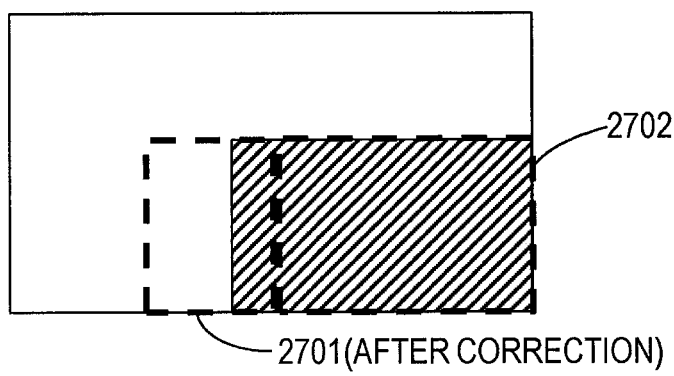

In the case of FIG. 32B, only the right neighbor point 2804 of the vertical color area 2701 is included in the horizontal color area 2601, hence the correction in (8) is executed. FIG. 33B shows a correction of the vertical color area 2701 by the vertical area correction unit 121. As FIG. 33B shows, the upper side of the vertical color area 2701 is corrected so that the Y coordinate value thereof matches with the Y coordinate value of the vertical side of the vertical color area 2702, which is at the right and adjacent to the vertical color area 2701. The vertical area correction unit 121 outputs a signal that indicates the corrected vertical color area 2701 and the vertical color area 2702 as a vertical correction area signal 131.

The monochrome/color area decision unit 2508 determines a color area based on the horizontal correction area signal 130 and the vertical correction area signal 131, and outputs a color area signal 2518 that indicates the determined color area. In concrete terms, the monochrome/color area decision unit 2508 determines an AND area of the horizontal color area indicated by the horizontal correction area signal 130 and the vertical color area indicated by the vertical correction area signal 131, as the final color area. The other area is determined as a monochrome area.

Figure 33C:
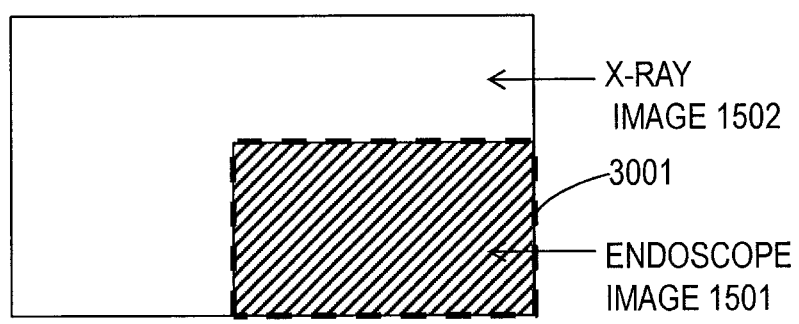

The broken line in FIG. 33C indicates a final color area 3001 determined by the monochrome/color area decision unit 2508. As FIG. 33C shows, according to the present embodiment the color area 3001 includes the entire area of the endoscope image 1501, and the image interference due to the brightness step difference can be decreased.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-081335, filed on Mar. 30, 2012, Japanese Patent Application No. 2012-084188, filed on Apr. 2, 2012, and Japanese Patent Application No. 2013-025904, filed on Feb. 13, 2013, which are hereby incorporated by reference herein in their entirety.

What is claimed is:

1. An image processing apparatus that determines a monochrome area and a color area of an input image, the apparatus comprising:
    an acquisition unit that acquires an image characteristic value of the input image; and
    a determination unit that determines whether each pixel group in the input image is a monochrome area or a color area based on the image characteristic value acquired by the acquisition unit, wherein
    the acquisition unit acquires a plurality of image characteristic values corresponding to a plurality of acquisition areas including a determination target pixel group, and
    the determination unit determines whether the pixel group is a monochrome area or a color area based on the plurality of image characteristic values corresponding to the plurality of acquisition areas including the pixel group.

2. The image processing apparatus according to claim 1, wherein
    the plurality of acquisition areas including the pixel group include a predetermined area and areas acquired by moving the predetermined area at least in one of the horizontal direction and the vertical direction by a moving distance smaller than the size of the predetermined area.

3. The image processing apparatus according to claim 2, wherein
    the predetermined area is an area of which a number of pixels in the horizontal direction is H (H is 2 or greater integer) and a number of pixels in the vertical direction is J (J is 2 or greater integer), and
    an area acquired by moving the predetermined area is an area acquired by moving the predetermined area by only K pixels (K is an integer not less than 1 and less than H) in the horizontal direction, an area acquired by moving the predetermined area by only L pixels (L is an integer not less than 1 and less than J) in the vertical direction, or an area acquired by moving the predetermined area by only K pixels in the horizontal direction and only L pixels in the vertical direction.

4. The image processing apparatus according to claim 1, wherein
    the determination unit buffers, for each pixel group, a monochrome ratio calculated based on each of the plurality of image characteristic values corresponding to a plurality of acquisition areas including the pixel group, in association with the pixel group, and
    determines, for each pixel group, whether the pixel group is a monochrome area or a color area, depending on the highest value of the plurality of monochrome ratios associated with the pixel group.

5. The image processing apparatus according to claim 1, wherein
    the determination unit buffers, for each pixel group, a color ratio calculated based on each of the plurality of image characteristic values corresponding to a plurality of acquisition areas including the pixel group, in association with the pixel group, and
    determines, for each pixel group, whether the pixel group is a monochrome area or a color area, depending on the lowest value of the plurality of the color ratios associated with the pixel group.

6. The image processing apparatus according to claim 1, wherein
    the determination unit determines, for each pixel group, whether the pixel group is a monochrome area, a color area or a black area, based on a plurality of image characteristic values corresponding to a plurality of acquisition areas including the pixel group, and
    regards the pixel group, which has been determined as a black area, as a monochrome area or a color area.

7. The image processing apparatus according to claim 6, wherein
    the determination unit detects four pixel groups constituted by two rows by two columns, where a part of the pixel group is a black area and a rest of the pixel group is a monochrome area or a color area, and
    regards the pixel group that is a black area, out of the four pixel groups, as a monochrome area or a color area, based on the arrangement of a monochrome area, a color area and a black area in the four pixel groups.

8. The image processing apparatus according to claim 1, wherein
    the determination unit determines, for each pixel group, whether the pixel group is a monochrome area, a color area, a black area, or a comment area based on a plurality of image characteristic values corresponding to a plurality of acquisition areas including the pixel group, and
    regards a pixel group, which has been determined as a black area and a pixel group, which has been determined as a comment area, as a monochrome area or a color area respectively.

9. The image processing apparatus according to claim 8, wherein
    the determination unit detects four pixel groups constituted by two rows by two columns, where a part of the pixel group is a black area, a part of the pixel group is a comment area, and the rest of the pixel group is a monochrome area or a color area, and
    regards the pixel group which is a black area and the pixel group which is a comment area, out of the four pixel groups, as a monochrome or a color area respectively, based on the arrangement of a monochrome area, a color area, a black area and a comment area in the four pixel groups.

10. The image processing apparatus according to claim 1, wherein
    the determination unit detects, as a horizontal monochrome area, a rectangular area constituted by a first pixel group, which has been determined as a monochrome area based on the image characteristic value of a predetermined area and that of an area acquired by moving the predetermined area in the horizontal direction by a moving distance smaller than the horizontal size of the predetermined area, and
    detects, as a vertical monochrome area, a rectangular area constituted by a second pixel group, which has been determined as a monochrome area based on the image characteristic value of the predetermined area and that of an area acquired by moving the predetermined area in the vertical direction by a moving distance smaller than the vertical size of the predetermined area, determines an OR area of the horizontal monochrome area and the vertical monochrome area as the monochrome area, and determines the rest of the area as the color area.

11. The image processing apparatus according to claim 10, wherein when a horizontal monochrome area exists which has, in the vertical direction, height that is same as the height of the predetermined area and in which at least one of an upper neighbor point and a lower neighbor point is included in a vertical monochrome area, the determination unit corrects the horizontal monochrome area.

12. The image processing apparatus according to claim 11, wherein

When the upper neighbor point of the horizontal monochrome area is included in a vertical monochrome area, the determination unit makes a correction so that a horizontal position of a side closer to the upper neighbor point, out of the right side and the left side of the horizontal monochrome area, matches with a horizontal monochrome area that is adjacent to the lower side of the horizontal monochrome area, and When the lower neighbor point of the horizontal monochrome area is included in a vertical monochrome area, the determination unit makes a correction so that a horizontal position of a side closer to the lower neighbor point, out of the right side and the left side of the horizontal monochrome area, matches with a horizontal monochrome area that is adjacent to the upper side of the horizontal monochrome area.

13. The image processing apparatus according to claim 10, wherein when a vertical monochrome area exists which has the width in the horizontal direction that is the same as the width of the predetermined area and in which at least one of a left neighbor point and a right neighbor point is included in a horizontal monochrome area, the determination unit corrects the vertical monochrome area.

14. The image processing apparatus according to claim 13, wherein when a left neighbor point of the vertical monochrome area is included in a horizontal monochrome area, the determination unit makes a correction so that a vertical position of a side closer to the left neighbor point, out of the upper side and the lower side of the vertical monochrome area, matches with a vertical monochrome area that is adjacent to the right of the vertical monochrome area, and when a right neighbor point of the vertical monochrome area is included in a horizontal monochrome area, the determination unit makes a correction so that a vertical position of a side closer to the right neighbor point, out of the upper side and the lower side of the vertical monochrome area, matches with a vertical monochrome area that is adjacent to the left of the vertical monochrome area.

15. The image processing apparatus according to claim 1, wherein the determination unit detects, as a horizontal color area, a rectangular area constituted by a first pixel group, which has been determined as a color area based on an image characteristic value of a predetermined area and that of an area acquired by moving the predetermined area in the horizontal direction by a moving distance smaller than the horizontal size of the predetermined area, and detects, as a vertical color area, a rectangular area constituted by a second pixel group, which has been determined as a color area based on the image characteristic value of the predetermined area and that of an area acquired by moving the predetermined area in a vertical direction by a moving distance smaller than the vertical size of the predetermined area, determines an AND area of the horizontal color area and the vertical color area as the color area, and determines the rest of the area as the monochrome area.

16. The image processing apparatus according to claim 15, wherein when a horizontal color area exists which has, in the vertical direction, height that is the same as the height of the predetermined area and in which at least one of an upper neighbor point and a lower neighbor point is included in a vertical color area, the determination unit corrects the horizontal color area.

17. The image processing apparatus according to claim 16, wherein when an upper neighbor point of the horizontal color area is included in a vertical color area, the determination unit makes a correction so that a horizontal position of a side closer to the upper neighbor point, out of the right side and the left side of the horizontal color area, matches with a horizontal color area that is adjacent to the lower side of the horizontal color area, and when a lower neighbor point of the horizontal color area is included in a vertical color area, the determination unit makes a correction so that a horizontal position of a side closer to the lower neighbor point, out of the right side and the left side of the horizontal color area, matches with a horizontal color area that is adjacent to the upper side of the horizontal color area.

18. The image processing apparatus according to claim 15, wherein the determination unit corrects the vertical color area when the width in the horizontal direction is the same as the width of the predetermined area, and at least one of a left neighbor point and a right neighbor point is included in a horizontal color area.

19. The image processing apparatus according to claim 18, wherein when a left neighbor point of the vertical color area is included in a horizontal color area, the determination unit makes a correction so that a vertical position of a side closer to the left neighbor point, out of the upper side and the lower side of the vertical color area, matches with a vertical color area that is adjacent to the right of the vertical color area, and when a right neighbor point of the vertical color area is included in a horizontal color area, the determination unit makes a correction so that a vertical position of a side closer to the right neighbor point, out of the upper side and the lower side of the vertical color area, matches with a vertical color area that is adjacent to the left of the vertical color area.

20. A method for controlling an image processing apparatus that determines a monochrome area and a color area of an input image, the method comprising:

an acquisition step of acquiring an image characteristic value of the input image; and a determination step of determining whether each pixel group in the input image is a monochrome area or a color area based on the image characteristic value acquired in the acquisition step, wherein in the acquisition step, a plurality of image characteristic values corresponding to a plurality of acquisition areas including the determination target pixel group are acquired, and in the determination step, whether the pixel group is a monochrome area or a color area is determined based on the plurality of image characteristic values corresponding to the plurality of acquisition areas including the pixel group.

* * * * *